United States Patent
Muschetto

(10) Patent No.: US 6,850,255 B2
(45) Date of Patent: Feb. 1, 2005

(54) METHOD AND APPARATUS FOR ACCESSING INFORMATION, COMPUTER PROGRAMS AND ELECTRONIC COMMUNICATIONS ACROSS MULTIPLE COMPUTING DEVICES USING A GRAPHICAL USER INTERFACE

(76) Inventor: James Edward Muschetto, 5477 Ventana Pl., Citrus Heights, CA (US) 95610

( * ) Notice: Subject to any disclaimer, the term of this patent is extended or adjusted under 35 U.S.C. 154(b) by 527 days.

(21) Appl. No.: 10/084,128

(22) Filed: Feb. 28, 2002

(65) Prior Publication Data

US 2003/0160815 A1 Aug. 28, 2003

(51) Int. Cl.[7] .................................................. G09G 5/00
(52) U.S. Cl. ....................... 345/788; 345/744; 345/746; 345/747; 345/764; 345/777; 345/853
(58) Field of Search ................................ 345/737–738, 345/777, 853–855, 751, 759, 753–757, 746–747, 744, 788

(56) References Cited

U.S. PATENT DOCUMENTS

| 5,305,435 | A | * | 4/1994 | Bronson ...................... 345/777 |
| 5,657,049 | A | | 8/1997 | Ludolph et al. |
| 5,745,096 | A | | 4/1998 | Ludolph et al. |
| 5,874,958 | A | | 2/1999 | Ludolph |
| 5,897,670 | A | | 4/1999 | Nielsen |
| 5,963,208 | A | * | 10/1999 | Dolan et al. ................. 345/760 |
| 6,078,327 | A | | 6/2000 | Liman et al. |
| 6,081,265 | A | * | 6/2000 | Nakayama et al. ......... 345/746 |
| 6,128,012 | A | * | 10/2000 | Seidensticker et al. ..... 345/685 |
| 6,133,898 | A | | 10/2000 | Ludolph et al. |
| 6,133,916 | A | | 10/2000 | Buckszar et al. |
| 6,133,918 | A | | 10/2000 | Conrad et al. |
| 6,175,364 | B1 | * | 1/2001 | Wong et al. ................. 345/763 |
| 6,252,597 | B1 | * | 6/2001 | Lokuge ....................... 345/841 |
| 6,307,574 | B1 | | 10/2001 | Ashe et al. |
| 6,351,776 | B1 | | 2/2002 | O'Brien et al. |
| 6,356,284 | B1 | | 3/2002 | Manduley et al. |
| 6,664,983 | B2 | * | 12/2003 | Ludolph ...................... 345/775 |

OTHER PUBLICATIONS

Aug. 1, 2002, Sun Microsystems, Inc. ("MIDP Style Guide"), p. 24.*

* cited by examiner

*Primary Examiner*—Ba Huynh
*Assistant Examiner*—Sara Hanne

(57) ABSTRACT

A GUI containing a panel along each of its edges is produced within a computer's display. Each of the four panels are always visible and accessible within the GUI and contain items that display or reference network-based information, communication, navigational systems, computer programs, and other items. These items have been assigned to the panels based upon a hierarchal containment system which, in the preferred embodiment of the invention, uses the categories "people, places, things, and home" as its first logical grouping of the various items and services a user would seek to utilize within the GUI. This organizational system, and its associated visual representation within the panels, enables the GUI to be displayed and operated within multiple computer devices, even though the designs of those devices may include a wide range of display and control systems. This consistency across various computing devices enables a user to quickly apply knowledge gained from having used the GUI on another computing device. Furthermore, the items presented within the GUI, as well as the GUI's configuration, are stored in, and retrieved from, a networked "server" computer thereby enabling a user to produce and access their familiar GUI workspace and items using a variety of networked computer devices. The GUI therefore may be accessed within multiple computing devices and provide access to information, computer programs, and electronic communications.

10 Claims, 19 Drawing Sheets

METHOD AND APPARATUS FOR ACCESSING INFORMATION, COMPUTER PROGRAMS AND ELECTRONIC COMMUNICATIONS ACROSS MULTIPLE COMPUTING DEVICES USING A GRAPHICAL USER INTERFACE

FEDERALLY SPONSORED RESEARCH

Not Applicable.

SEQUENCE LISTING OR PROGRAM

Not Applicable.

FIELD OF THE INVENTION

This invention relates to accessing information, communications, and computer programs across multiple computing devices using a graphical user interface (GUI).

BACKGROUND—DESCRIPTION OF PRIOR ART

A computer system typically employs a graphical user interface (GUI) to present information to a user on a display device and, through the use of input devices (e.g., a mouse, keyboard, keypad, touch-screen, or other sensing systems), permits the user to interactively manipulate elements displayed within the GUI. Such manipulations are interpreted by a executing computer program managing such a GUI, as directives to control the operation of its computer and thus perform tasks desired by its user. Computer devices employing such interfaces vary widely in performance, physical size, types of input and display systems, as well as optimization for specialized tasks (a cellular telephone or handheld computer, for example). As such, users of these devices are confronted with an equally diverse range of GUI designs. Each of these GUIs must be learned and practiced by a user in order to be successfully operated. Users unfamiliar with operating a new device may find they can only apply a small subset of the operational knowledge they've gained from understanding the GUIs of other devices. Furthermore, software applications that operate within such GUIs may present an equally diverse range of visual and operational idiosyncrasies.

A primary benefit of visual and operational consistency in GUI systems, is the speed with which a user may learn the operation of a new computer device. If the GUI of a new device is consistent with the GUI of a device familiar to a user, such a user would recognize similarities between the two GUIs and thus intuitively apply his or her existing knowledge of the familiar GUI. Unfortunately, visual and operational consistency among GUI systems has not been adequately served by GUI designs in the prior art. Furthermore, although network connectivity is commonly included in many computer devices, they lack a shared, network-based GUI system that can serve users' need for communication with other networked users, or access to network-based information and computer programs.

A typical GUI used to manage the operating system (OS) of a personal computer often relies upon the analogies made between items appearing in the GUI and items commonly found on a person's desk. As such, the predominant portion of the GUI's available display area is commonly referred to as a "desktop". A desktop, as provided by popular GUI systems such as the UNIX-based X-Windows system, Microsoft's Windows, and Apple's Macintosh OS, consists of a user-configurable workspace containing items that represent resources (e.g., computer files, applications, printing devices, and other items) available to the computer presenting the desktop. These desktops may also contain items that, via a network connection, enable users to access similar resources residing in other computers. Such GUIs, however, always define their desktops using the specific configurations and resources available to the computers in which they operate. As a result of this, if a user performs tasks using such a GUI in a first computer, and later attempts to use a second, equally equipped computer, the GUI functioning in the second computer cannot provide the same working environment (e.g., desktop configuration, files, applications, and other resources) found in the first computer. Furthermore, if that same user chooses to employ a computer that uses a different operating system, he or she will confront not only different resources and applications, but a different GUI design (for example, a Windows GUI instead of a Macintosh GUI). In the prior art, the GUIs of operating systems in personal computers provide users with configurable workspaces defined by the resources available to the specific computers in which such GUIs operate, yet do not provide users with means of producing their familiar desktops in other computers.

A portable computing device, such as a handheld computer or PDA (e.g., "personal digital assistant" such as 3Com Corporation's Palm Pilot), typically employs its GUI in the same manner as the previously described personal computers. As such, a portable device's GUI is based on its unique configuration and available resources, with the primary differences being consequences of its small physical size. Generally, these differences are reduced performance of a device's central processing unit (CPU), limited data-storage capacity, and the limited size, number and color of picture elements (pixels) provided by its display system. A user of such a portable computing device would typically use it when away from his or her larger personal computer. Later, that user might employ a network connection to transfer data from the portable device to a personal computer for further processing. When that same user attempts to continue working with the transferred data in his or her personal computer, the user will encounter significant differences between the computer's GUI design and the GUI used in the portable device. Additionally, users will find PC-based applications for accessing and editing such transferred data to be significantly different from such applications on portable computers. As with personal computers, a user of a portable computing device is not provided by the device's GUI with a means of producing his or her familiar desktop environment and resources in another computer the user chooses to employ.

An example of a highly specialized computing device that employs a GUI, is a wireless mobile telephone (e.g., a cellular telephone). Such devices employ simple, highly-specialized GUI implementations because of their limited input and display systems (e.g. simple keypads and displays with limited pixel-resolution). Therefore, the GUIs of mobile telephones bear little similarity to a GUI a user would employ on his or her personal computer or PDA. In fact, in the prior art, the GUIs of mobile telephones provide very little visual and operational consistency with the GUIs of other classes of computer devices. Mobile telephones frequently incorporate the capability of connecting to a data network (such as the Internet). This feature enables a user to accomplish some of the tasks the user might commonly perform at his or her desktop computer (accessing world wide web sites or email, for example). Before a user can perform such tasks, however, the user must first learn and practice the operation of the GUI in his or her mobile telephone. Additionally, the user must undertake this learning process without benefit of applying a significant portion of the knowledge he or she has gained through use of GUIs used in other computer devices. Once a user has learned the GUI of his or her mobile telephone, the user must also gain proficiency with the device's networking applications in order to accomplish his or her network-related tasks. Such applications are also likely to be visually and operationally different from applications of similar purpose a user might find in a personal computer.

Operating system GUIs in the prior art have not been designed to address users' need for visual and operational consistency across multiple classes of computer devices. This is primarily because such GUIs have been designed to make use of the highest level of visual complexity that can be rendered by the display systems of the specific class of computers for which they are designed. For example, the manufacturers of Microsoft Corporation's Windows and Apple's Macintosh operating systems specify that their GUIs are designed for a minimum display resolution of 640 horizontal pixels by 480 vertical pixels (the minimum resolution of the desktop and laptop class of computers). Likewise, the GUI of 3Com Corporation's Palm OS is designed to fit only the PDA class of computers with a display resolution of 160 horizontal pixels by 160 vertical pixels. For both of these classes of computers, those operating system manufacturers have designed GUIs that permit as many GUI elements (e.g. GUI controls, objects, and organizational structures) as can fit into their computers displays. Although such a design-practice has been common in the prior art, basing a GUI's permitted display complexity solely on this criteria prohibits a GUI's implementation across a wide variety of devices. For example, rendering Microsoft's Windows GUI in a PDA-class display would result in a desktop that is clearly unwieldy for a user to operate. In such a case, the GUI's objects, controls, dialog windows, and other structures will not completely fit into the available display area causing some to be partially or totally hidden from a user's view. If the GUI of the Palm OS were to be implemented in the large display of a desktop computer, it would not scale to utilize the available display area. This is because the Palm OS does not include a facility for scaling its GUI beyond the resolution found in its specific class of computer.

Attempts to create software applications to address a user's need for GUI portability can be found in the prior art. Such applications (Symantec Corporation's pcAnywhere, for example) have been created to enable a user to gain access to the GUI of a distant computer by means of replicating a computer's GUI display and user-input systems in a second computer. Such software uses a network or modem link between two computers to display the GUI of a first personal computer within a application window presented in the GUI of a second personal computer. When a user operates the second computer's input systems (e.g., mouse and keyboard) within such a application window, the associated control signals are transferred to the first computer. A software application running in the first computer then interprets the control information and uses it to control the first computer's GUI. To implement such a system, a user must install and execute such software in each of the two computers. The program executing in the first computer transmits continually updated images of that computer's GUI display to the second computer which presents the most recent image in the software's application window. Although such systems enable a user to access the GUI of a distant personal computer from a second computer, these systems do not actually transport and execute the GUI's program code in the second computer; such software simply functions as an extension of the display and keyboard of the distant computer allowing it to be remotely controlled. Furthermore, such systems cannot be practically employed if small, portable computing devices are used to access larger personal computers due to the previously noted differences in their respective display systems. A smaller device's display does not permit convenient presentation of the larger, and often more complex, display image generated by the GUI of a typical personal computer.

Other attempts to serve users' need for GUI portability include systems, such as Lotus Corporation's Notes, that provide a user with a GUI presented within a software application window on a personal computer. The "client" software of such a system produces its GUI using configuration data stored in the personal computer in which the client executes, as well as resources maintained on a network-accessible "server" computer. Software executing in the server computer communicates with the client software and supplies data and application resources needed by the user. Thus such systems are commonly referred to as "client/server" systems. If a user employing such a client at a first computer chooses to perform tasks using identical client software at a second computer, the user will be able to employ the same client-GUI he or she used at the first computer. There are reasons, however, why such client/server systems in the prior art have not adequately served users' needs for portability, as well as visual and operational consistency, when operated using dissimilar computers and client implementations:

(a) Client/server systems in the prior art (Lotus Corporation's Notes, for example) have not been designed to specifically enforce visual and operational consistency within their client implementations. In fact, in the case of Lotus' Notes, developers are encouraged by Lotus Corporation's documentation to freely customize the GUIs of client implementations including the quantity and arrangement of GUI elements. Such customization can and does lead to complex client-GUIs, intended for use in desktop computers, that are impossible to properly render on the displays of smaller computing devices. In such cases, any client implementations developed for smaller computer devices will necessarily be visually and operationally different from its desktop counterpart. A user encountering such differing GUI designs must learn and practice the implementations before he or she can use them. Because the manufacturers of client/server systems in the prior art have not designed them using common subsets of clearly perceivable visual and operational characteristics, such systems cannot guarantee effective reconstruction of a user's familiar working environment across a variety of computing devices.

(b) Client/server systems in the prior art do not provide efficient GUI-portability because they require a user to confirm or install platform-specific client software in a computer before he or she can use such a system. Although confirmation of properly installed client software might not appear to be an inhibition to GUI-portability, the increasing trend of dependence upon "loaned" computing devices by users seeking GUI-portability lessens the likelihood that they will find appropriate clients installed in such computers. Examples of such loaned computers include publicly accessible computer devices, as well as those provided by a user's businesses associates, family, friends and others. To use any of these computers, client/server systems require software-clients to be created in high-level programming languages (e.g., C, C++, and others) and compiled to native, processor-executable code for specific computer and operating system combinations. For example, a user seeking to operate a client/server system using a computer based on Intel Corporation's Pentium CPU and the Linux operating system must confirm the installation of client software developed specifically for that computer and OS combination. If a user seeks to operate a client/server system in a computer that has not had an installation of such software, the user must possess diskettes, or another data storage medium, containing installation programs designed for the specific OS and hardware used in that computer. The user must then install and configure such software before the desired client/server system may be used. If the client/server system's manufacturer has not yet developed a client implementation for the user's computer and OS, the user will not be able to access his or her familiar client-GUI on that computer.

(c) In the prior art, the use of "native" GUI-controls in the clients of client/server systems often contribute to visual and operational inconsistency and therefore reduced portability. Developers creating clients for such systems predominantly employ the "native" GUI-controls supplied by the operating system in which the client will run. For a user seeking to employ such systems over a wide variety of client implementations, idiosyncrasies among equivalent native controls can reduce the user's recognition of those controls and his or her perception of predictability in their operation. For example, the locations and visual designs of the controls for closing and iconifying GUI windows vary significantly between Microsoft's Windows, Apple's Macintosh OS, and the X-Windows GUI common to many UNIX systems. The behavior and appearance of menus, selection-lists, scrollbars and other controls in these systems vary as well. Although efficient GUI-portability is served when a user encounters recognizable, predictable controls among all client implementations, such factors are not in evidence for the designs of client/server systems in the prior art.

An early system that provided a measure of transportability for a user's working environment was the "host/terminal" system. Such systems use video display terminals (VDTs) connected to a central "host" computer, and operate in a manner similar to the previously described client/server systems. User input is transferred to a host computer by a VDT and is processed by software executing in the host computer. Display data, generated by such software, is subsequently sent from the host computer to the VDT in order to update the terminal's display. A user who has performed tasks using one of the VDTs in the system may later use another VDT to access an identical workspace. In the prior art, such systems have been deployed primarily in large offices where large numbers of identical terminals can provide efficient distribution of a company's information resources. Although such systems can provide transportability of a user's working environment among the systems' terminals, these systems have not been designed to provide consistent user interfaces across a wide variety of computer devices. In the prior art, devices other than a system's standard terminals have been adapted for use in such a systems. The GUI systems provided for those devices, however, generally possess minimal visual and operational consistency with their terminal-based counterparts.

In conclusion, it can be seen that few systems in the prior art attempt to serve users' need for GUI-portability and that none of those systems is able provide such portability without significant degradation of visual and operational consistency.

OBJECTS AND ADVANTAGES

Accordingly, the objects and advantages of the present invention relate to addressing users' needs to efficiently access information, communication, data, and software resources using a wide variety of computer devices. Objects and advantages of the present invention are:

(a.) to provide a GUI that is based on a hierarchal containment structure that enables it to be efficiently implemented and displayed in a wide variety of computer devices;

(b.) to provide a GUI that presents its architectural elements and controls in a visually and operationally consistent manner, thus making the GUI recognizable and predictable to a user when the GUI is used in an unfamiliar computer device;

(c.) to provide a GUI that is simple for a user to learn and use, yet efficiently serves the most common tasks a user would seek to perform using a portable GUI;

(d.) to provide a GUI that can be reliably delivered and easily made operational within a user's chosen computer devices;

Still further objects and advantages will become apparent from a consideration of the ensuing description and drawings.

SUMMARY OF THE INVENTION

In the preferred embodiment of the invention, a user initiates operation of the present invention by using a computer to contact a network-accessible server computer. Program code, supplied by the server computer, is then transferred by the user to his or her computer device and execution of the code is begun. In other embodiments of the invention, a user may initiate operation of the invention by starting execution of program code that resides in a storage system within a computer device operated by the user. Such executing program code presents a graphical user interface (GUI) in the display system of the user's computer, thus providing the user with means to engage in further interaction with the invention.

A hierarchal containment structure is used to control the presentation of all visual elements within the invention's GUI. This hierarchal structure is defined by a categorization and optimized progressive revelation of the GUI's visual elements. Such definitions are the result of an analysis of the most common tasks a typical user would seek to perform using a specific embodiment of the invention. The elements presented in the invention's GUI include data objects, application objects, container objects, and control objects, as well as visual structures that enhance a user's understanding of the relationships between those elements. Upon initialization, the invention's GUI displays visual elements representing the "root-level" of its hierarchal structure. Although this root-level may contain a plurality of GUI-elements, the number of such elements is limited so that the invention's GUI may be presented on computer devices with smaller display systems (e.g. displays with limited pixel resolution). The elements presented at the root-level will include several container objects, an object that terminates operation of the invention and, in some embodiments, an object for iconifying the window in which the GUI is presented.

In the preferred embodiment of the invention, the root-level of the invention's hierarchy is represented in its GUI as four partially-exposed container objects, designed as movable panels, and controls for terminating operation of the invention and iconifying an OS window containing the GUI. These panels are the means by which a user accesses the second level of the invention's hierarchy. Each panel represents a hierarchal branch whose contents may include GUI-elements and further hierarchal branches. Such contents are selected for inclusion in a panel based on the panel's category. Such categories represent logical divisions of data resources and functionality that a typical user would seek to access using the invention. In the preferred embodiment of the invention, the root-level panels are defined by four categories, "People", "Places", "Things" and "Home". These categories have been chosen to establish a psychological linkage between a user's understanding of the familiar colloquial expression "people, places, and things" and the elements a user might expect to find within the like named panels. Such an expression is often used to verbally define a natural division of the elements found in a person's daily life. Likewise, the elements a user may expect to find in the invention's root-level panels closely follow these divisions, thus encouraging a user's intuitive understanding of the invention's GUI.

In the preferred embodiment of the invention, the invention's People panel contains items that create, store manage, and schedule communications with other users of a network (e.g., a user's interaction with other people). The invention's places panel contains items that represent a network's organization, facilitate searching a network, or reference retrievable items stored in the file systems of other networked computers (e.g., "places" to visit within a network). The invention's things panel may contain either of two different sets of items depending upon the business-purpose for which the invention is deployed. If the invention is deployed as part of a commercial enterprise, to be used by members of the general public within a public network (e.g., the Internet), its things panel will contain items that advertise, search for, and facilitate the purchasing of goods and services (e.g., things to purchase). If the invention is deployed by an organization for use by authorized users, the Things panel will contain specific elements related to that organization (database query utilities and business applications, for example).

The invention's hierarchal organization, and its associated visual representation within its root-level container objects, enables the GUI to be displayed and operated within multiple computer devices, even though the designs of those devices may include a wide range of display and control systems. This consistency across various computing devices enables a user to quickly apply knowledge gained from having used the GUI on another computing device. Furthermore, the items presented within the GUI, as well as the GUI's configuration, are stored in, and retrieved from, a networked "server" computer thereby enabling a user to produce and access their familiar GUI workspace and items using a variety of networked computer devices. The GUI therefore may be accessed within multiple computing devices and provide access to information, computer programs, and electronic communications.

DETAILED DESCRIPTION OF THE INVENTION

A method and apparatus for accessing information, computer programs and electronic communications across multiple computing devices is described. In the following description, numerous specific details are set forth in order to provide a more thorough description of the present invention. It will be apparent, however, to one skilled in the art that the present invention may be practiced without these specific details. In other instances, well-known features have not been described in detail so as not to obscure the invention.

Figure 1:
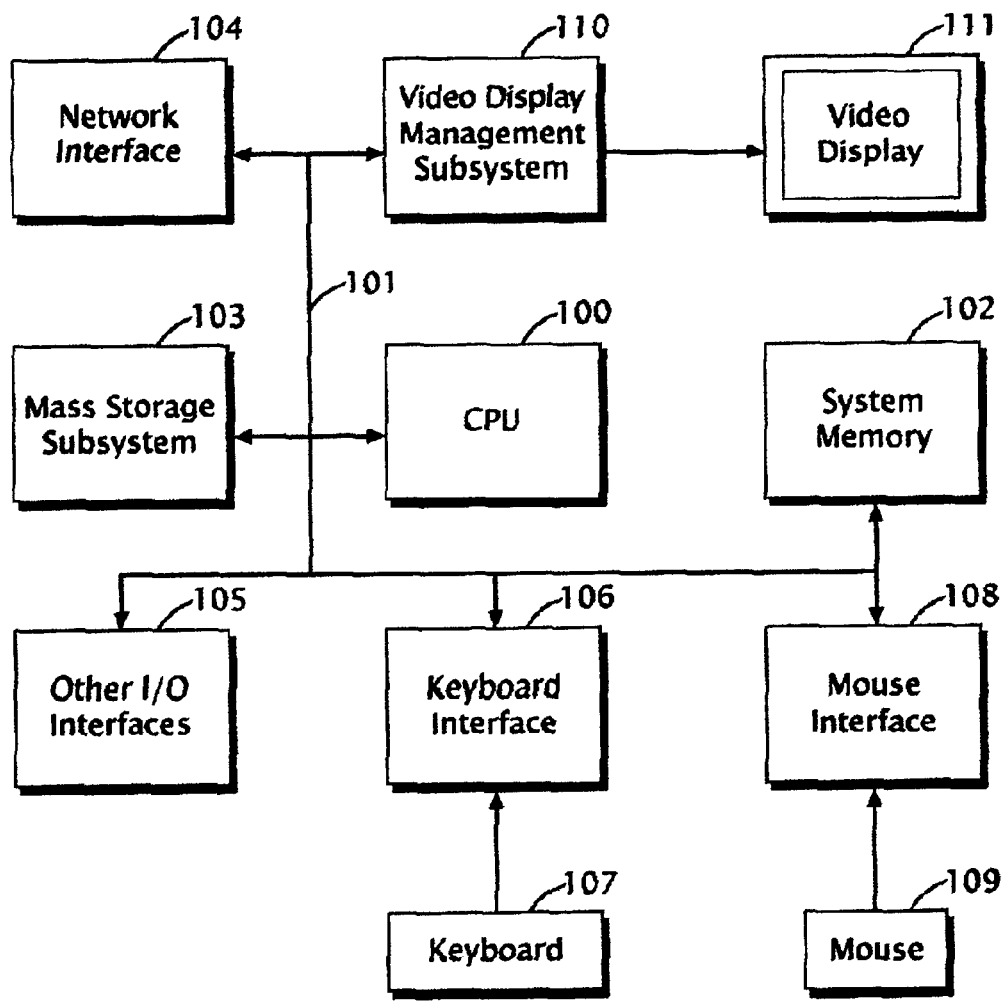
FIG. 1 provides an example of a general purpose computer that can be used in one embodiment of the invention.

The present invention can be implemented using a general purpose computer connected by any network system that will permit bi-directional transfer of data between the computers and a server computer. Such a general purpose computer is illustrated in FIG. 1. A keyboard 107 and mouse 109 are coupled via their respective hardware interfaces, 106 and 108, to a bi-directional system bus 101. Keyboard 107 and mouse 109 are used for introducing user input to the computer system for processing by CPU 100. Bi-directional system bus 101 conveys data, address, and control signals between and among the computer's components, which include CPU 100, system memory 102, network interface 104, mass storage subsystem 103, video display management subsystem 110, and other I/O interfaces 105. Video display management subsystem 110 stores and converts pixel data into video signals suitable for use by video display 111 to which it is connected. Video display 111 is used to display data in the form of graphical images to the user of the computer. All of the above components are well-known in the art and may be implemented by any suitable means.

In the preferred embodiment of the invention, CPU 100 is a 32-bit microprocessor such as a Pentium microprocessor manufactured by Intel or a Power PC microprocessor manufactured by Motorola. However, any other suitable microprocessor or microcomputer may be utilized. System memory 102 is comprised of dynamic random access memory (DRAM). Network Interface 104 is a Ethernet-compatible networking device. Mass storage subsystem 103 is implemented using any suitable mass storage technology, such as magnetic or optical systems, and may include both fixed and removable media. Video display 111 is a monitor which uses a liquid crystal display (LCD), cathode ray tube (CRT), or any other display technology that is suitable for displaying graphic images.

The computer system described above is for purposes of example only. The present invention may be implemented in any type of computer system or programming or processing environment.

Using embodiments of the invention, a graphical user interface (GUI) is used, in conjunction with a network and server computer, to access information, computer programs and electronic communication across multiple computer devices. A user starts the invention's GUI within the display screen of a computer device by initiating execution of program code that is either resident in the device or downloaded by the user into the device's memory from a server computer through use of a network. This GUI provides visual and operational consistency among the computer devices in which it is implemented because its design adheres to a underlying hierarchal containment structure that enables efficient operation using the wide variety of display and input systems found in those devices. To further serve this consistency, the invention also uses a data network to store a user's personal data files, operational preferences, and other items in the mass storage subsystem of a server computer. A user may then operate the invention using a variety of computer devices and be assured that the server will make these preferences, files, and items accessible within the invention's GUI.

Software Implementation

In the preferred embodiment of the invention, the invention's GUI, and any objects within it, are written in a programming language that permits creation of network-distributable program code such as Sun Microsystems' Java. Thus the GUI provided by the preferred embodiment of the invention is a Java application or applet and software applications executing within it are serialized Java language objects or Java Beans. Such Java applications, applets, serialized Java language objects, and Java Beans are network-distributable software objects that can be executed in a computer device using a software application called a "Java Virtual Machine" (JVM). However, any language and system for creating and executing network-distributable software objects, such as Microsoft Corporation's "C#" language and ".NET Framework", may be used to implement the invention's GUI and objects.

In the preferred embodiment of the invention, the user will employ a general-purpose computer (as previously described using FIG. 1), computer network, and a "web browser" application to access a World Wide Web (WWW) server computer. In accordance with the "hypertext transfer protocol" (HTTP) used by such browser applications, certain "environment" information about the user's web browser and computer will be returned to the WWW server computer. Furthermore, the document (e.g., web page) transferred during this access will initiate the execution of a small Java applet that is run by a JVM within such web browser. This applet will gather further information about the computer's display characteristics, performance, JVM revision level, and other factors related to the applet's operational environment. This information, and the browser's environment information, is transmitted to the invention's server computer. Software executing in the server will analyze the information to determine the most appropriate means of producing the invention's GUI in the user's computer. Such environment-analysis software is well-know in the art. In the preferred embodiment of the invention, a user may gain access to the GUI by selecting a link (e.g., clicking a hypertext link using a mouse) on the web page to retrieve a "login" web page from a "secure" web server. Such servers use the Secure Sockets Layer (SSL) standard to provide encrypted communications with web browsers. On the login web page, the user will enter his or her "user-name" and "password" into a hypertext markup language (HTML) form and select the form's "Submit" button to send the form to the secure server. Software executing in the invention's server then uses authentication procedures that are well-known in the art to verify that user-name and password. Such a server computer will also determine the operating characteristics of the invention's GUI based on its user's predefined preferences, as well as the items and resources such a user will be permitted to access within the GUI. Upon validation of a user's login information, the secure web server will transfer a web page to the browser containing text that confirms the validation and informs the user that the invention's GUI will appear soon. The web page also contains JavaScript (a scripting-language that can be embedded within a web page) code that produces a new, small web browser window and closes its own browser window (e.g., the browser window used thus far). That new window presents a web page containing HTML code that initiates the transfer and execution of an applet that will provide the invention's GUI. Such an applet will have been specifically chosen by the server computer, over several different versions, to accurately match the environment information retrieved from the computer in which the invention's GUI is operating. A JVM in a user's web browser will begin execution of that applet and produce a "windowing context" (e.g., a Java Window object) covering the predominant portion of the user's computer display. The invention's GUI is then produced within this windowing context.

Preferred Embodiment—Structure and Behavior

In the preferred embodiment of the invention, the invention's GUI initially presents four sliding panels along each of its edges which are always visible and accessible within the GUI during its operation. These panels contain items that display or reference network-based information, communication, navigational systems, computer programs, and other items. Such items have been assigned to the panels based upon a hierarchal containment system which uses the categories "People, Places, Things, and Home" as its first logical grouping of the various items and services a user would seek to utilize within such a GUI. This organizational system, and its associated visual representation within the panels, are among several elements that enable the GUI to be displayed and operated within multiple computer devices, even though the display and control systems of those devices may have limited capabilities (e.g., limited pixel resolution or limited user-input systems).

In the preferred embodiment of the invention, the GUI produces the People, Places, Things, and Home panels with consistent positioning, orientation, and operational characteristics, as well as the hierarchies of items included in those panels. This visual and operational consistency is maintained so that a user will perceive clear similarities between the invention's implementation in a computer device with which they are not familiar, and its implementation in a device with which they are experienced. Thus the user can intuitively apply knowledge gained through use of a familiar implementation and thereby efficiently use the invention among a variety of computing devices.

In the preferred embodiment of the invention, the initial presentation of the GUI will have the People, Places, Things, and Home panels rendered in their closed states (e.g., their closed representations). In this state, only a narrow portion of the edge of each panel is exposed along the edge of the GUI with a center portion of the edge curved to form a "handle" shape. In the preferred embodiment of the invention, as well as those embodiments wherein sufficient display resolution is available, each panel will also contain an image (e.g., an icon) within this handle portion of the exposed edge to further suggest the purpose of the panel to a user of the invention. A user gains access to the contents of such a panel by selecting the handle area within the panel's exposed edge using a input device (e.g., a mouse, keypad, or other input system). This selection produces a "panel state event" that causes a panel to slide from its closed state at the edge of the GUI to its open state thereby exposing its contents. If a user wishes to close a panel, he or she would again select that same edge of the panel thereby producing another "panel state event" that closes the panel.

FIGS. 2 Through 10—Preferred Embodiment

Figure 2:
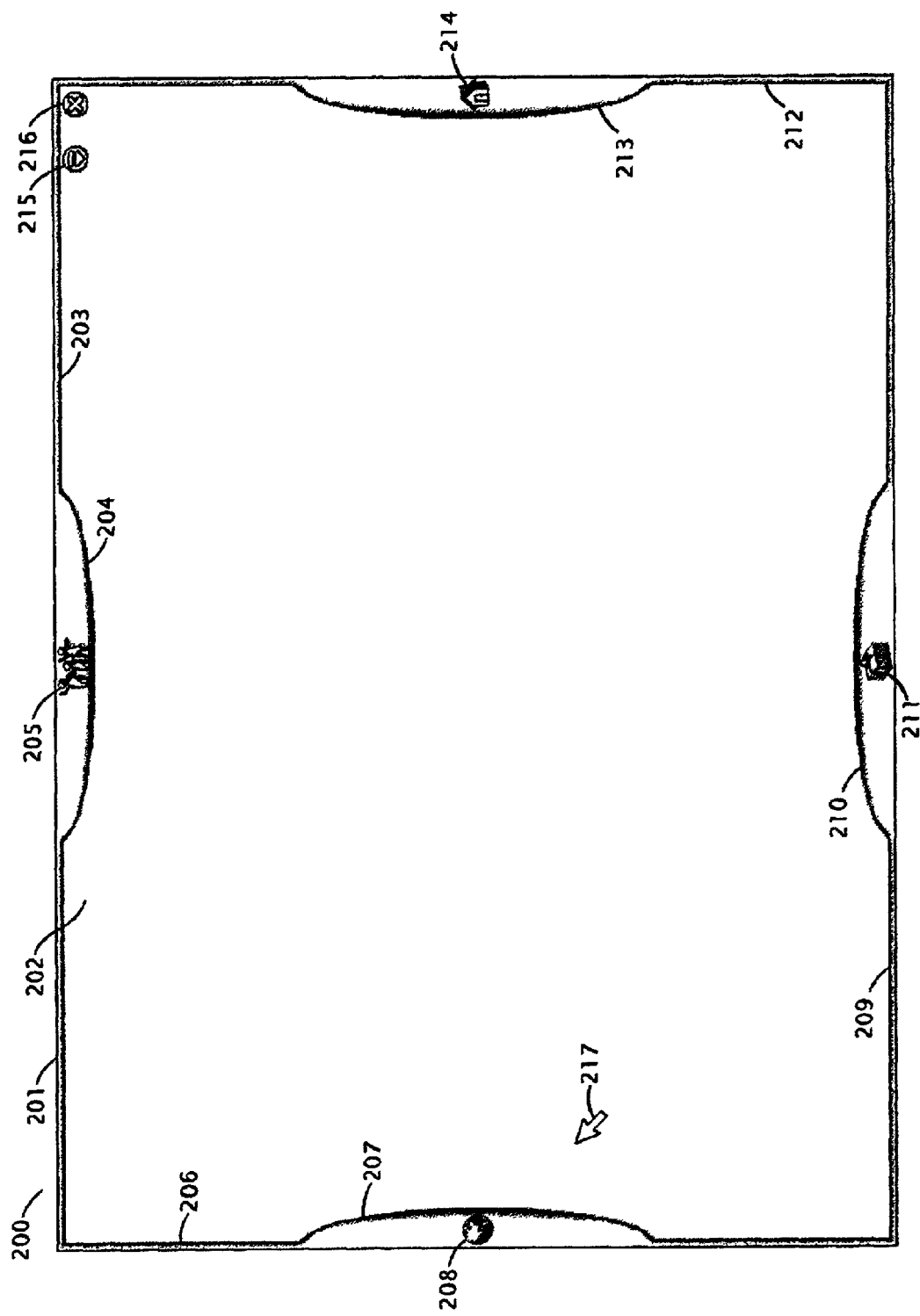
FIG. 2 provides an example of the invention's GUI as produced within a computer's display according to one embodiment of the invention.

FIG. 2. provides an example of the invention's GUI as it would appear upon its initial presentation to a user according to one embodiment of the invention. The invention's GUI produces all of its visible elements within a windowing context 201 that covers a predominant portion of the operating system's GUI 200. The People panel 203, Places panel 206, Things panel 209, and Home panel 212 are initially presented in their closed states at each of the sides of the invention's GUI 201. Icons 205, 208, 211, and 214 are provided to further identify the panels. In the preferred embodiment of the invention, the central portion of each panel's 203, 206, 709, and 212 edge is curved to form "handles" 204, 207, 210, and 213 to accommodate these icons and provide a further visual suggestion to a user that the computer's pointing device and cursor 217 may be used to select and "slide open" the panels toward the central portion of the GUI 202 (similar to pulling open a desk drawer). In the GUI's 201 upper-right corner are a "iconify" button 215 and a "close" button 216. If a user selects the iconify button 215, the invention's GUI 201 will be made invisible leaving the small browser window from which the GUI's applet was started. If a "Restore" link within the browser window is selected, the GUI's window 201 will be made visible. If a user selects the close button 216, a dialog window will be presented in the central portion of the GUI 202 to confirm the user's choice of the close button 216. If the user confirms the choice, the user's operational session with the invention will be ended, the GUI window 201 and its associated applet will be terminated, and the small browser window that started the applet will be closed.

Figure 3:
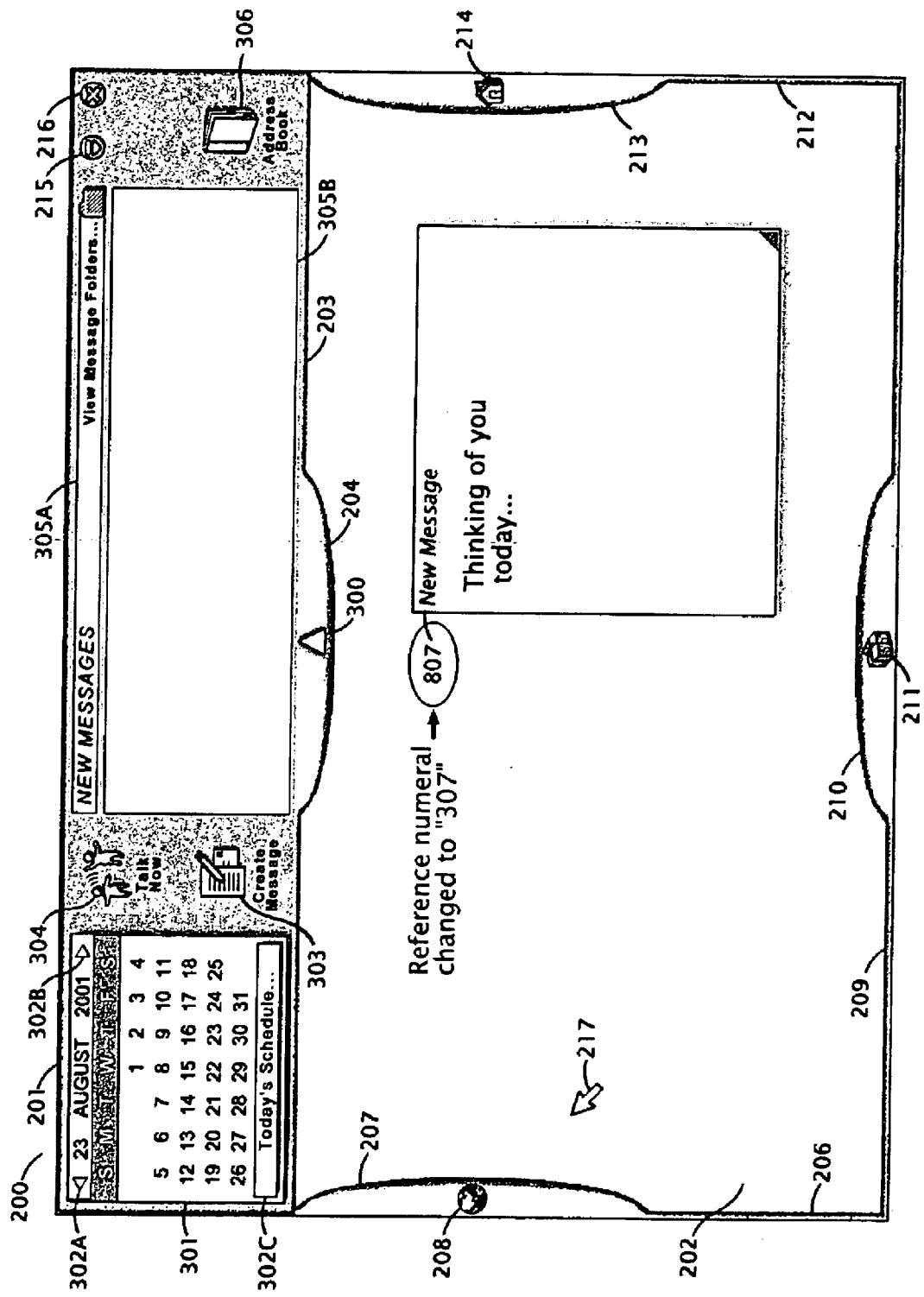
FIG. 3 provides an example of panel 203 in its open state according to one embodiment of the invention, as well as an example of a application object used to create a email message.

FIG. 3 provides an example of the People panel 203 in its open state after the invention's GUI has processed an associated panel state event according to one embodiment of the invention. If the People panel 203 is in its closed state (as illustrated in FIG. 2.), a user's selection of its exposed edge (e.g., clicking the exposed edge with a mouse) will produce a panel state event. In response to the event, the invention's GUI 201 moves the panel 203 to its open state thereby exposing the panel's contents. An arrow icon 300 replaces the panel's identification icon 205 (as illustrated in FIG. 2.) on the panels edge. The purpose of the arrow icon 300, is to provide a visual suggestion to the user that his or her selection of the panel's edge will return the panel 203 to its closed state. The iconify item 215 and close item 216 are not obscured by the opening of the panel 203, but remain visible in their previous positions as illustrated in FIG. 2. The iconify item 215 and close item 216 always remain visible and function as previously described regardless of the open or closed states of any object intersecting their display areas. The items contained in the People panel 203 are a calendar item 301, a synchronous messaging item 304, an asynchronous message creation item 303, an address book item 306, and a message management item comprised of a message folders list 305A and a message list area 305B. Such items and their operation will be further described to demonstrate how such items can be included in the hierarchal containment structure of the present invention and employed by the invention's user.

The calendar item 301 visually resembles a desk calendar a user might find in his or her office. When a user selects sub-items within the calendar item 301, their corresponding item activation events cause the invention's GUI to either reconfigure the calendar item 301 or activate a scheduling application object in the central portion of the invention's GUI 202. Such schedule objects provide the user with a means of viewing and editing his or her appointment schedule. Among the items within the calendar item, is a "Today's Schedule . . . " button 302C. When selected, this button 302C causes the invention's GUI to activate a schedule object in central portion 202 that displays the user's schedule for the current date. If any date depicted within the calendar item 301 is selected, the resulting schedule object will display the user's schedule for the selected date. Finally, the calendar item 301 provides two small arrow-shaped buttons 302A and 302B. When the left arrow button 302A is selected, the calendar item 301 will be reconfigured to represent the month previous to the one currently displayed. Likewise, when the right arrow button 302B is selected, the calendar item 301 will be reconfigured to represent the month after the one currently displayed.

If the synchronous messaging item 304 is selected by the user, the invention's GUI will respond to the associated item event by activating a synchronous messaging application object in the central portion of the invention's GUI 202. The user may then access items within that object to establish such synchronous messaging sessions (real-time chat, Internet telephony, and audio and video conferencing for example). If the asynchronous message creation item 303 is selected, the invention's GUI will respond to the associated item event by activating an asynchronous message creation object 307 in the central portion of the invention's GUI 202. A user may then use the asynchronous message creation object 307 to compose and send a message that will be transmitted through the invention's interaction with a server. A message management item is comprised of a message folders list 305A and a message list area 305B. The message folders list 305A is provided in the form of a "drop-down list". A drop-down list is a GUI element that is well-known in the art and displays textual items in a list when selected by a user. If a user of the present invention selects the message folders list 305A, it opens to display a list of names of folders provided for the management of a user's asynchronous messages (e.g., email, voice-mail, and others). The invention's GUI will respond to a user's selection of a folder's name by causing the message list area 305B to display a list of textual items referencing messages associated with the selected folder. If a user selects an item in the message list area 305B, the invention's GUI will respond to the associated item event by retrieving the referenced message from its storage location and activating it within the central portion of the GUI 202. If the address book item 306 is selected by a user, the invention's GUI will respond by activating an address book object in the central portion of the invention's GUI 202. A user may use that object to store, manage and utilize contact information about people and organizations.

Figure 4:
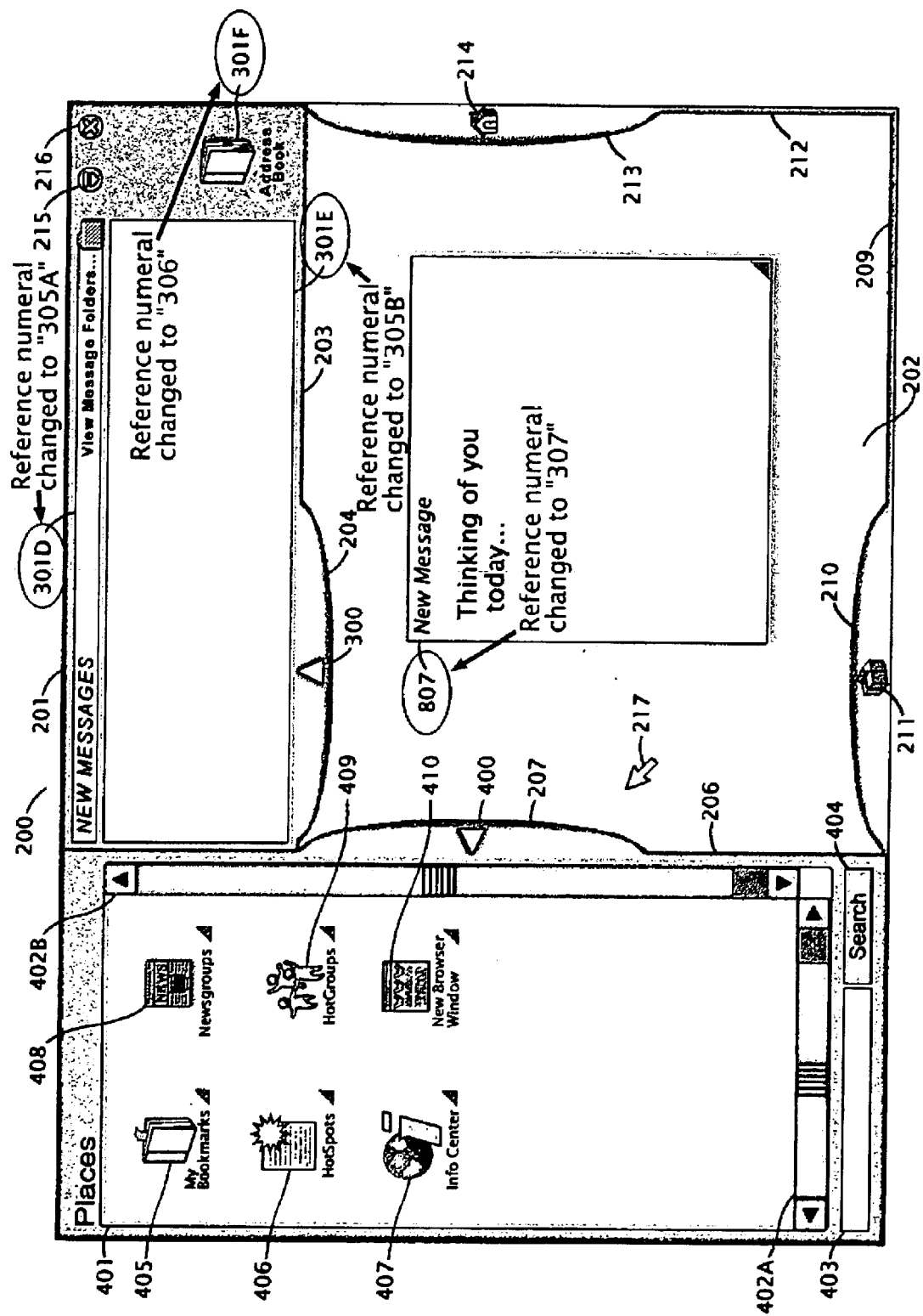
FIG. 4 provides an example of panels 203 and 206 in their open states according to one embodiment of the invention.

FIG. 4. provides an example of Places panel 206 in its open state after the invention's GUI has processed an associated panel state event according to one embodiment of the invention. If Places panel 206 is in its closed state (as illustrated in FIG. 3.), a user's selection of its exposed edge (e.g., clicking the exposed edge with a mouse) will produce a panel state event. In response to this event, the invention's GUI causes Places panel 206 to enter its open state thereby exposing the panel's contents. Arrow icon 400 replaces identification icon 208 (as illustrated in FIG. 3.) on the edge of Places panel 206 when the panel is opened. The purpose of arrow icon 400 is to provide a visual suggestion to the user that his or her selection of the panel's edge will return Places panel 206 to its closed state. FIG. 4. also illustrates Places panel 206 overlapping People panel 203. This arrangement is a result of a user's having opened Places panel 206 when People panel 203 was already in its open state. Additionally, this arrangement of panels would result if both panels were open, arranged with People panel 203 overlapping Places panel 206, and a user were to select any portion of Places panel 206 except for the portion of the panel's edge that generates a panel state event. This is because a user's selection of a open panel causes the invention's GUI to position the selected panel as the topmost of any open panels (e.g., assigns it to the top of the z-order).

Places panel 206 contains panel content area 401, as well as a search item comprised of text entry field 403 and search button 404. When Places panel 206 is initially opened, the search item (403 and 404) and the contents of panel content area 401 represent the elements of the invention's hierarchy that are immediately beneath the level represented by Places panel 206. A user may access further levels within the hierarchy of Places panel 206 by using these items. Panel content area 401 is implemented as a "scroll-panel". A scroll-panel is a GUI container element, well-known in the art, that provides "scrollbars" when a scroll-panel's contents cannot be completely arranged and rendered within its assigned display area. Thus, if the display area allocated to panel content area 401 is not sufficient to permit the contents of panel content area 401 to be fully arranged and rendered, panel content area 401 will provide horizontal scrollbar 402A and vertical scrollbar 402B. When Places panel 206 is initially opened, panel content area 401 contains items 405–410. A user may access messaging groups using Newsgroups item 408 or HotGroups item 409. When either of these items is selected, the invention's GUI will respond to the associated item event by presenting a navigational tree in panel content area 401 containing references to messaging groups. A user may access data and application objects by selecting HotSpots item 406 or Info Center item 407. Selection of either of those items will cause the invention's GUI to present a navigational tree in panel content area 401 containing references to groups of data and application objects. If a user selects "My Bookmarks" item 405, the invention's GUI will respond to its associated item event by presenting a navigational tree of references to a user's preferred Internet web sites, messaging groups, data or program objects, or files a user has previously stored in the server computer with which the invention's GUI interacts. This navigational tree is presented in panel content area 901, replacing the group of items (405–410) displayed there. A user may select "New Browser Window" item 410 to cause a new web browser window produced by the default browser in the computer in which the invention is operating. The search item (403 and 404) may be used to search all hierarchal levels accessible within Places panel 206. To use the search item, a user would enter keywords into text entry field 403 followed by selection of search button 404. The invention's GUI will respond to the associated item event by requesting a database search-process of the invention's server computer. The results of this search will be displayed in a navigational tree in panel content area 401.

Figure 5:
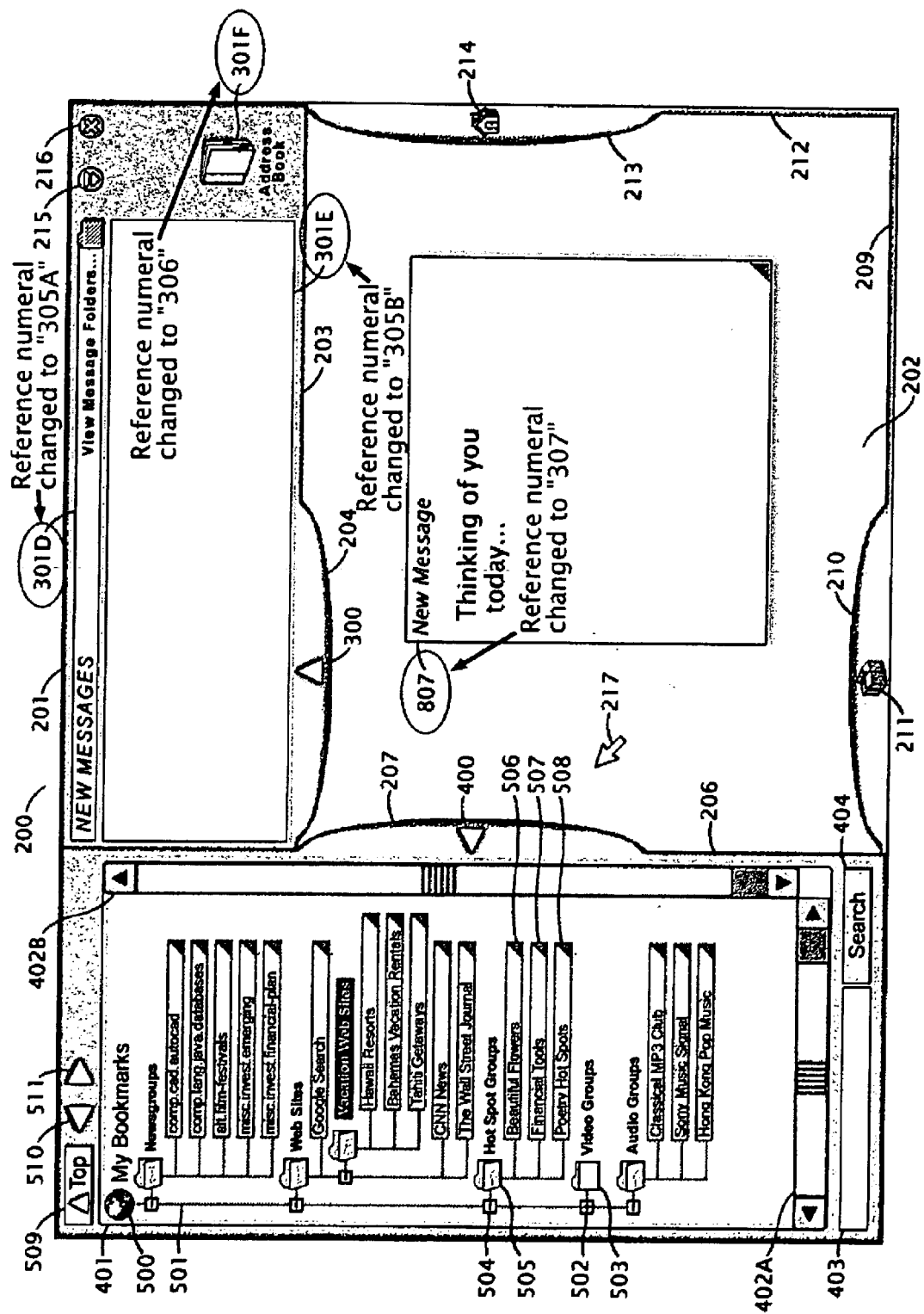
FIG. 5 provides an example of a navigational tree structure within panel 206 according to one embodiment of the invention.

FIG. 5. provides an example of a navigational tree presented in panel content area 401 following a user's selection of an item in Places panel 206 according to one embodiment of the invention. If My Bookmarks item 405 (as illustrated in FIG. 4.) is selected, the invention's GUI will respond to the associated item event by presenting the bookmarks navigational tree. The bookmarks navigational tree is comprised of root identifier 500, and various folder items, interconnecting dashed lines, node items, and reference items. The bookmarks navigational tree represents the elements of the GUI's hierarchy that are at and beneath the level represented by My Bookmarks item 405 (as illustrated in FIG. 4.) within Places panel 206. Root identifier 500 provides a title and icon for the navigational tree that visually indicates the tree's association with the previously selected My Bookmarks item 405 (as illustrated in FIG. 4.) The root level of the bookmarks navigational tree is indicated by dashed line 501 extending from root identifier 500 to each node item at the root level of the tree. Additionally, similar dashed lines are used to indicate further hierarchal levels and structural associations within the tree. Node items are used to provide indication of hierarchal branches and also indicate whether a branch is currently displayed or hidden within a navigational tree. In regard to the bookmarks navigational tree illustrated in FIG. 5., the node items are comprised of a node icon connected by a short dashed line to a folder icon. An example of such a node item is node icon 502 connected by a short dashed line to folder icon 503. In this case, the node item is in its "closed state". When a node item is in such a closed state, the hierarchal level represented by the node is not displayed in its navigational tree. Node icon 502 displays a "plus" symbol (e.g., a "+") to indicate that the node may be selected in order to cause its hierarchal level to be displayed within the bookmarks navigational tree. In addition, folder icon 503 is displayed as an image of a closed folder, further suggesting to a user that the folder may be "opened" to reveal its contents (e.g., the items that exist at the node item's hierarchal level). The node item comprised of node icon 504 and folder icon 505 provides an example of a node item in its "open state", and displaying its associated hierarchal level. In this case, node icon 504 displays a "minus" symbol (e.g., a "−") and folder icon 505 is displayed as a image of a closed folder. Additionally, to represent the items that exist at the node item's hierarchal level, group items 506, 507, and 508 are displayed with dashed lines interconnecting them and the opened node item.

At the top of Places panel 206 is top button 509, back button 510, and forward button 511. These items permit a user to navigate his or her "sequence" of navigational selections within Places panel 206. Such systems for navigating a user's sequence of navigational selections is well-known in the art and routinely included in Internet web-browser software in the form of "Back", "Forward", and "Home" buttons. A user may select back button 510 to traverse the hierarchy of Places panel 206 using the user's sequence of previous navigational selections. Upon selection, the group or navigational tree that was displayed at each selection within the sequence would again be displayed in panel content area 401. A user may select forward button 511 to traverse the hierarchy of Places panel 206 using the user's sequence of previous navigational selections, before his or her use of the back button 510. Upon selection, the group or navigational tree that was displayed at each selection within the sequence would again be displayed in panel content area 401. A user may select top button 509 to return to the top of the hierarchy of Places panel 206. Upon selection, the group of items representing the top of the hierarchy within the places panel (e.g., those items displayed when the panel was initially opened) would be displayed in Places panel 206.

Figure 6:
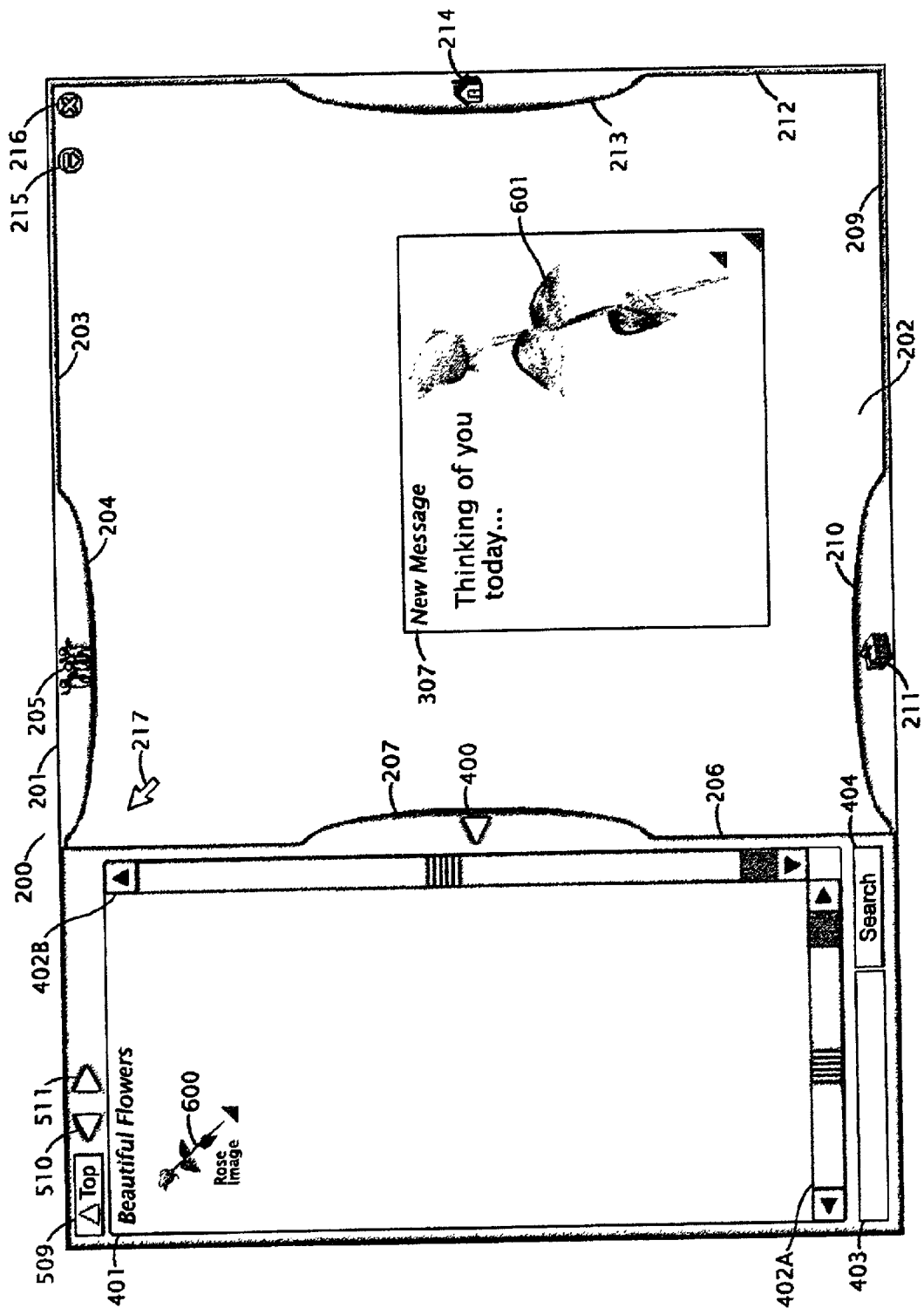
FIG. 6 provides an example of a component being added to an application object GUI according to one embodiment of the invention.

FIG. 6. provides an example of a object group presented in panel content area 401 following a user's selection of an item in a navigational tree within Places panel 206 according to one embodiment of the invention. If "Beautiful Flowers" object group item 506 (as illustrated in FIG. 5.) is selected, the invention's GUI will respond to the associated item event by presenting its associated object group in panel content area 401. That object group is comprised of a title at the top of panel content area 401, as well as the icons of the object items within the object group. If a user selects object item 600 for a "drag and drop" operation, and specifies message creation object 307 as its "drop target" (e.g., the GUI element beneath the mouse cursor when the mouse button is released during a drag and drop operation), active object 601 will become active in the central portion of the invention's GUI 202 and operationally associated with message creation object 307.

Figure 7:
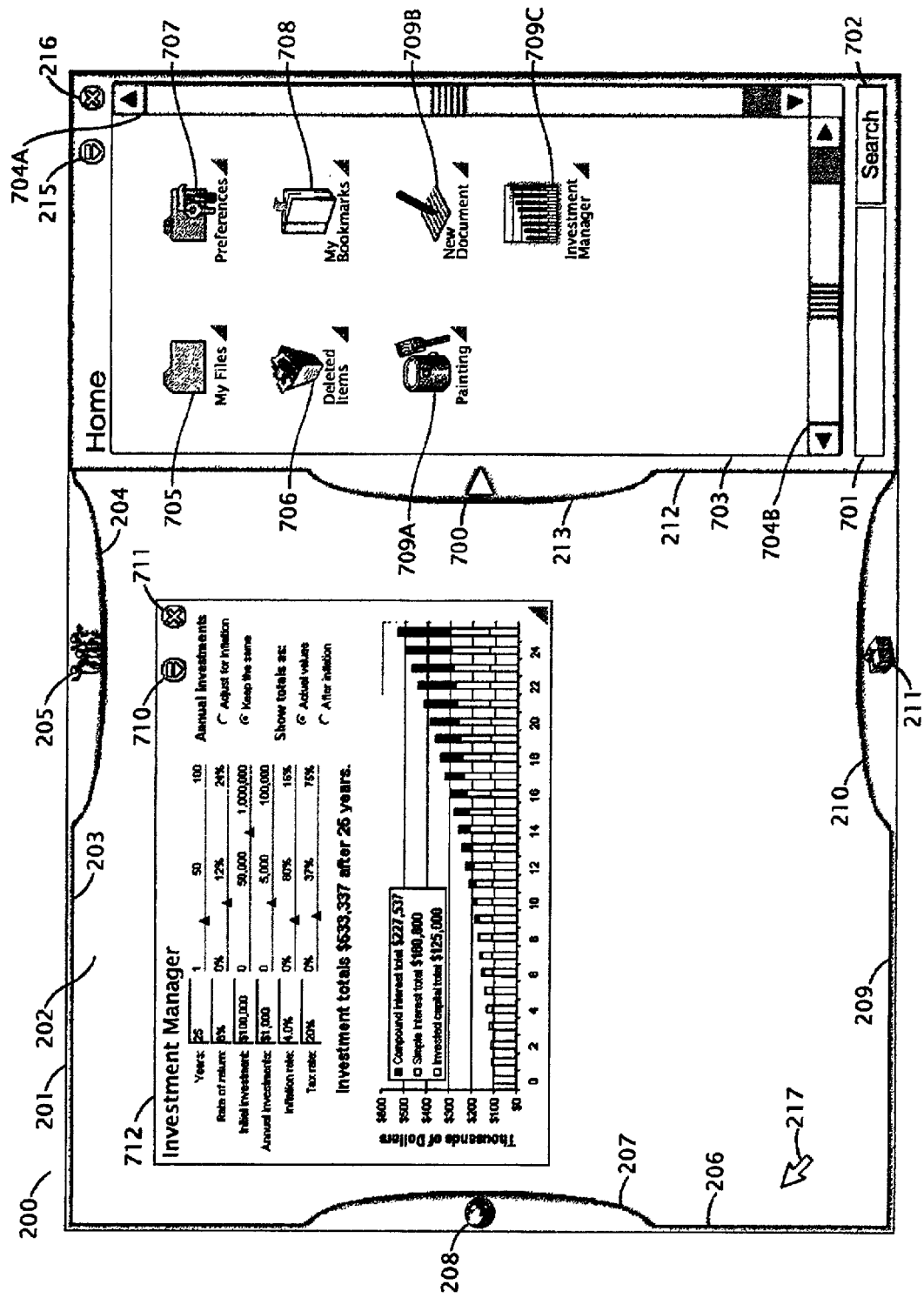
FIG. 7 provides an example of panel 212 in its open state and an active application object according to one embodiment of the invention.

FIG. 7. provides an example of Home panel 212 in its open state after the invention's GUI has processed an associated panel state event according to one embodiment of the invention. If Home panel 212 is in its closed state (as illustrated in FIG. 2.), a user's selection of its exposed edge (e.g., clicking the exposed edge with a mouse) will produce a panel state event. In response to the event, the invention's GUI causes Home panel 212 to enter its open state thereby exposing the panel's contents. Arrow icon 700 replaces identification icon 214 (as illustrated in FIG. 2.) on the edge of Home panel 212 when the panel is opened. The purpose of arrow icon 700 is to provide a visual suggestion to the user that his or her selection of the panel's edge will return Home panel 212 to its closed state. Home panel 212 contains panel content area 703, as well as a search item comprised of text entry field 701 and search button 702. When Places panel 212 is initially opened, the search item and the items within panel content area 703 represent the elements of the GUI's hierarchy that are immediately beneath the level represented by Home panel 212. A user may access further levels within the hierarchy of Home panel 212 by selecting those items. Panel content area 703 is implemented as a scroll-panel, with the same operational and visual characteristics as panel content area 401 (as illustrated in FIG. 4.) within Places panel 206. Thus if the display area allocated to panel content area 703 is not sufficient to permit its contents to be fully arranged and rendered, vertical scrollbar 704A and horizontal scrollbar 704B will be provided so a user may scroll the panel content area's viewable region.

When Home panel 212 is initially opened, panel content area 703 contains items 705–708, as well as any object items a user had previously assigned to the top hierarchal level of Home panel 212. In the example provided in FIG. 7, object items 709A–709C represent items a user would have previously assigned to this level. If a user selects one of these user-assigned object items, its associated object will be made active in central portion 202. Application object 712 represents such an active application object. Application object 712 may be "iconified" (e.g., reduced to an icon within central portion 202) by a user's selection of minimize item 710. Application object 712 may be made to terminate its operation by a user's selection of close item 711. If a user selects My Bookmarks item 708, the GUI will respond to the associated item event by presenting a navigational tree of the user's bookmarks in panel content area 703 replacing the group of objects displayed there. This navigational tree of bookmarks is identical to the navigational tree of bookmarks accessible within Places panel 206 and is made accessible within Home panel 212 as a convenience to the user. If a user selects an item in the navigational tree of bookmarks, the GUI will respond to the associated item event in a manner appropriate to the item's type. If a user selects My Files item 705, a navigational tree representing a hierarchy of objects and files the user had previously stored on a server computer with which the invention interacts. If a user selects Deleted Items item 706, the same navigational tree displayed for My Files item 705 will be displayed, except that a "Deleted Items" folder within its hierarchy will be presented in its opened state. The deleted items folder contains items previously deleted by the user from his or her storage in a server computer with which the invention interacts. If a user selects an item in the deleted items folder, the item will be restored to its original location within the user's storage in the server computer. If Preferences item 707 is selected, the GUI will respond to the associated item event by activating an application object in central portion 202 wherein a user may adjust operational characteristics of the invention's GUI.

Figure 8:
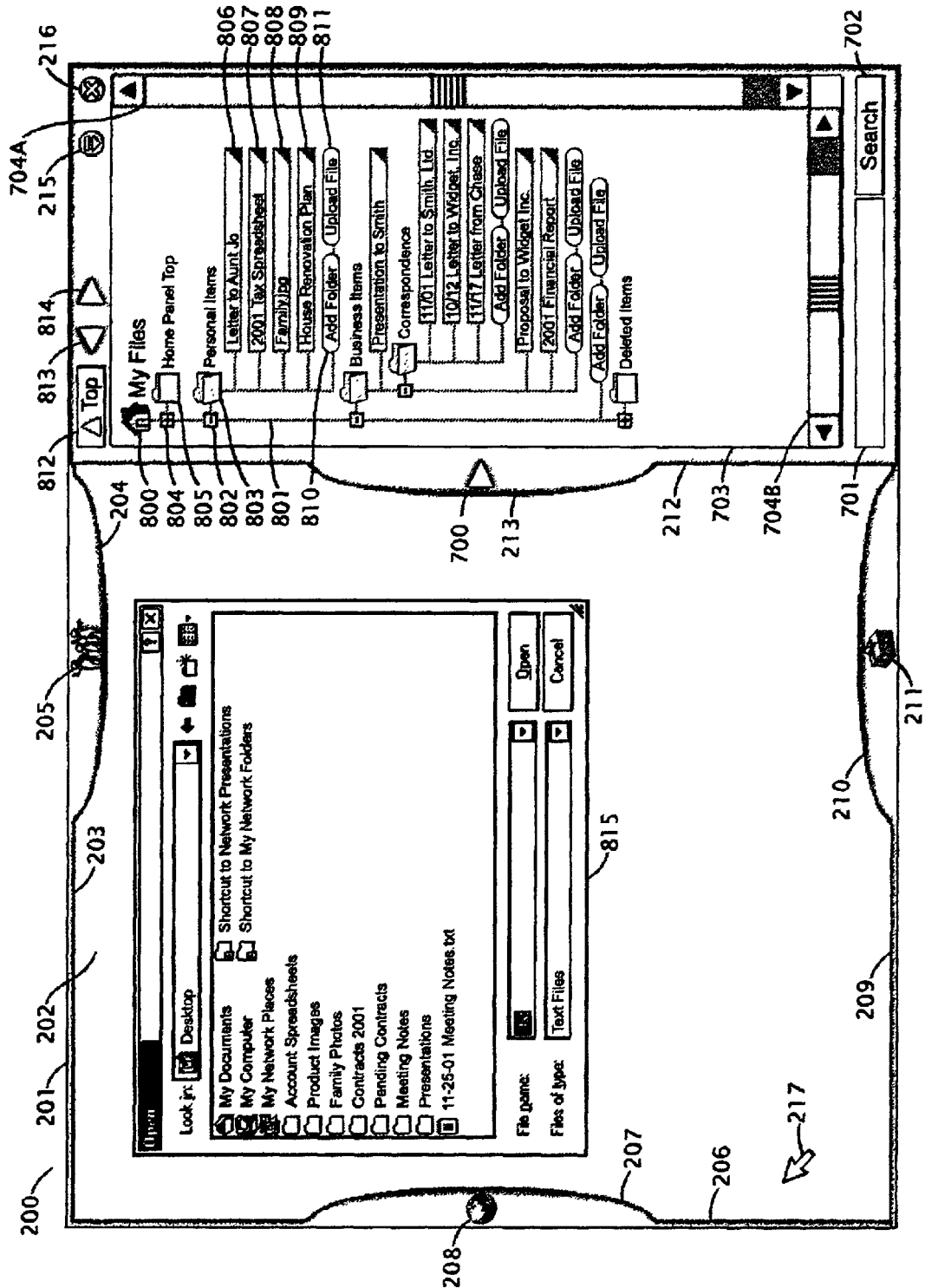
FIG. 8 provides an example of a navigational tree structure within panel 212, as well as a file-selection window used to specify a file for uploading from a user's local computer to a network-based storage system according to one embodiment of the invention.

FIG. 8. provides an example of a navigational tree presented in panel content area 703 following a user's selection of an item in Home panel 212 according to one embodiment of the invention. If My Files item 705 (as illustrated in FIG. 7.) is selected, the GUI will respond to the associated item event by presenting the "My Files" navigational tree. The My Files navigational tree is comprised of root identifier 800, and various folder items, interconnecting dashed lines, node items, and reference items, as well as items to initiate creation of new folders and uploading of files. The My Files navigational tree represents the elements of the GUI's hierarchy that are at and beneath the level represented by My Files item 705 (as illustrated in FIG. 7.) within Home panel 212. Root identifier 800 provides a title and icon for the navigational tree that visually indicates the tree's association with the previously selected My Files item 705 (as illustrated in FIG. 7.) The root level of the My Files navigational tree is indicated by dashed line 801 extending from root identifier 800 to each node item at the root level of the tree. Additionally, similar dashed lines are used to indicate further hierarchal levels and structural associations within the tree. Node items are used to provide indication of hierarchal levels (e.g., "branches") and also indicate whether a level is currently displayed or hidden within the navigational tree. The node items illustrated in FIG. 8. are comprised of a node icon connected by a short dashed line to a folder icon. An example of such a node item is node icon 804 connected by a short dashed line to folder icon 805. In this case, the node item is in its "closed state". When a node item is in such a closed state, the hierarchal level represented by the node is not displayed. Node icon 804 displays a "plus" symbol (e.g., a "+") to indicate that the node may be selected in order to cause its hierarchal level to be displayed within the My Files navigational tree. In addition, folder icon 803 is displayed as an image of a closed folder, further suggesting to a user that the folder may be "opened" to reveal its contents (e.g., the items that exist at the node item's hierarchal level). The node item comprised of node icon 802 and folder icon 803 provides an example of a node item in its "open state" and thus displaying its associated hierarchal level. In this case, node icon 802 displays a "minus" symbol (e.g., a "−") and folder icon 803 is displayed as an image of a open folder. Additionally, to represent the items that exist at that node item's hierarchal level, group items 806 and 807 and file items 808 and 809 are displayed with dashed lines interconnecting them and the opened node item.

Because the My Files navigational tree (as illustrated in FIG. 8.) permits a user to manage file storage in a networked server computer, each hierarchal level of the tree contains two items not appearing in other navigational trees presented by the invention's GUI. These items are the "Add Folder" and "Upload File" items. If an Add Folder item is selected by a user, the invention's GUI will interpret the associated item event by creating a new hierarchal level immediately below the level at which the Add Folder item appears. An example of an Add Folder item is Add Folder item 810. If a user selects Add Folder Item 810, a new folder item will be added to the group of items interconnected by dashed lines with folder icon 803. If an "Upload File" item is selected by a user, a file selection window will be presented in central portion of the GUI 202. A user may then use that window to select a file within the mass-storage system of the computer in which the invention is operating to be transferred to the user's file storage facility within in a server computer with which the invention interacts. Selection window 815 is an example of such a file selection window. Such file selection windows are typically supplied by the operating system of the computer in which the invention is operating.

Figure 9:
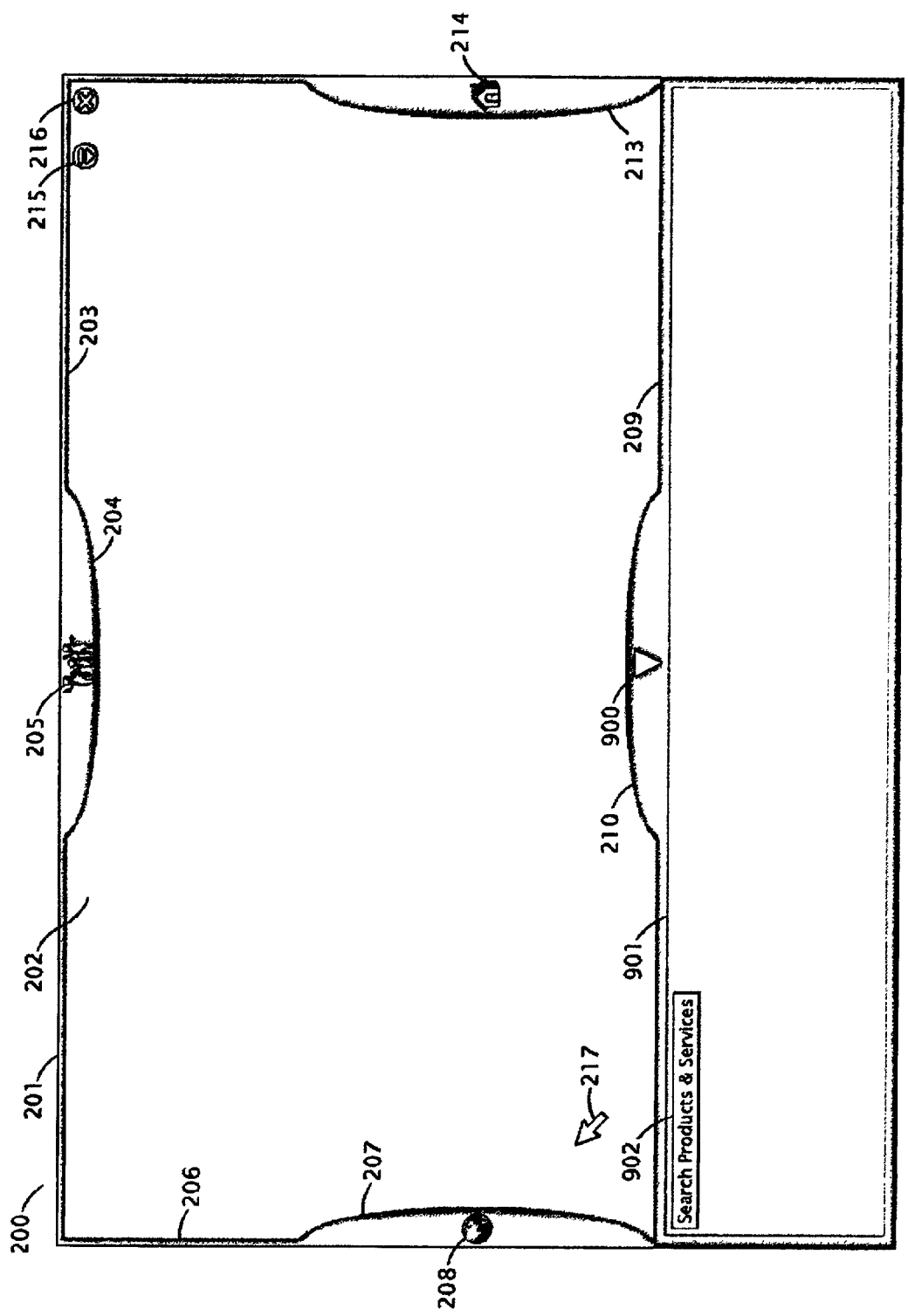
FIG. 9 provides an example of panel 209 in its open state according to one embodiment of the invention.

FIG. 9. provides an example of Things panel 209 in its open state after the invention's GUI has processed an associated panel state event according to one embodiment of the invention. E-commerce application object 901 becomes active in the predominate portion of Things panel 209 upon the panel's opening. Although FIG. 9. provides an example of a single e-commerce application object, more than one e-commerce application object may be presented within Things panel 209. The size of Things panel 209 (e.g., the extent of its movement toward the center of the invention's GUI when opened) is determined by the size of the e-commerce application objects it contains (e.g., the height of e-commerce application object 901). "Search Products and Services" item 902 is displayed as a small button, superimposed above the upper-left corner of Things panel 209. If "Search Products and Services" item 902 is selected by a user, the contents and configuration of Things panel 209 will be modified to provide items that permit the user to search a server computer's database for references to e-commerce objects pertaining to products and services.

Figure 10:
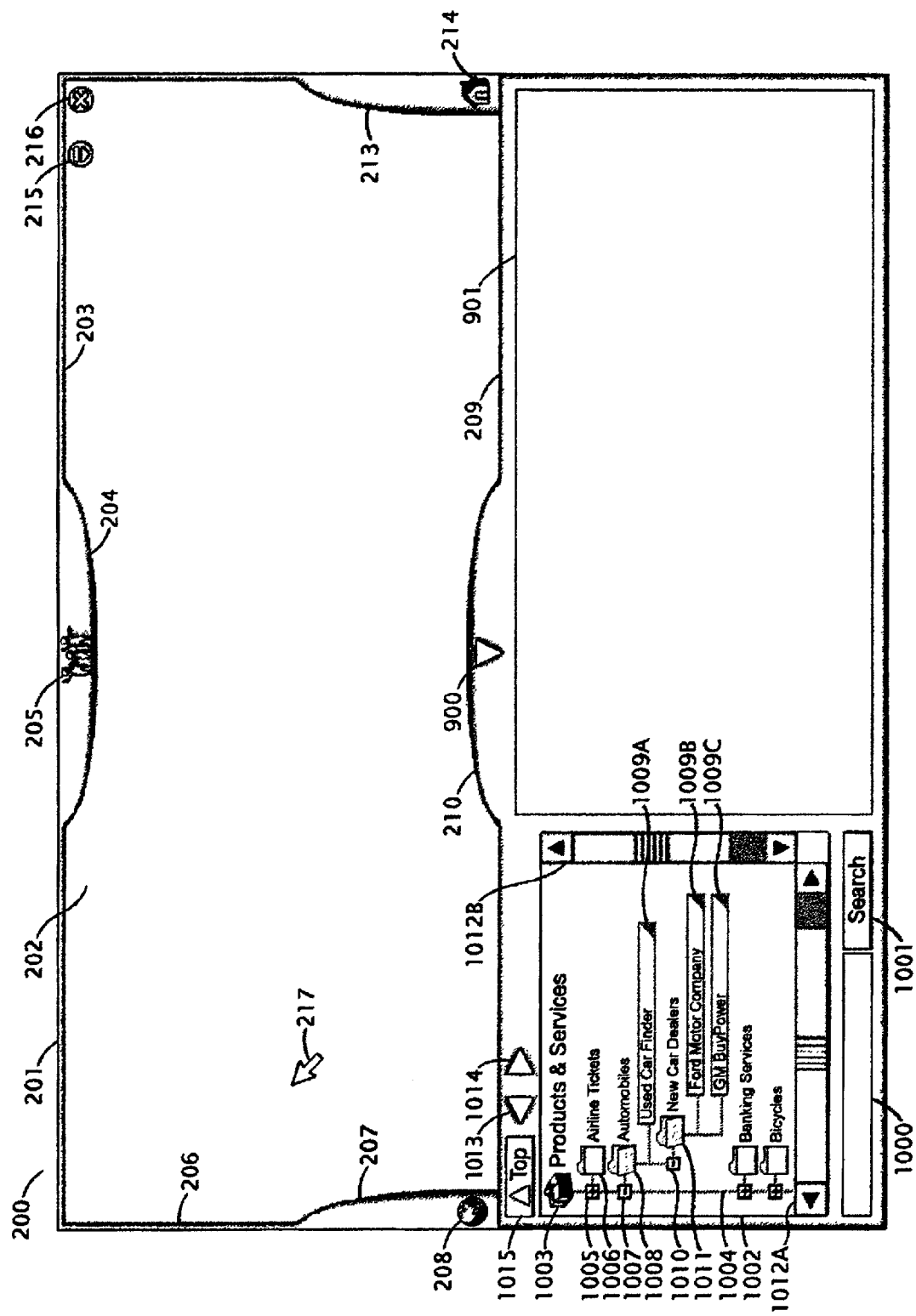
FIG. 10 provides an example of panel 209 showing navigational components according to one embodiment of the invention.

FIG. 10. provides an example of Things panel 209 in its open state and following a user's selection of "Search Products and Services" item 902 (as illustrated in FIG. 9.) according to one embodiment of the invention. If "Search Products and Services" item 902 (as illustrated in FIG. 9.) is selected by a user, the size of Things panel 209 will be adjusted to accommodate scrollable panel 1002 containing its associated scrollbars (1012A and 1012B), as well as top button 1015, back button 1013, forward button 1014, and a search item comprised of text area 1000 and search button 1001. The aspect ratio of e-commerce application object 901 will also be modified to permit these items to be displayed at its left within Things panel 209. Scrollable panel 1002 will, upon its initial appearance, contain a "Products and Services" navigational tree of references to e-commerce application objects. The structure of this tree and the references it contains are obtained from a database in a server computer with which the invention interacts.

The Products and Services navigational tree, illustrated in FIG. 10, is comprised of root identifier 1003 and various folder items, interconnecting dashed lines, node items, and reference items. Root identifier 1003 provides a title and icon for the navigational tree thus visually indicating the tree's association with the previously selected Search Products and Services item 902 (as illustrated in FIG. 9.) The root level of the Products and Services navigational tree is indicated by dashed line 1004 extending from root identifier 1003 to each node item at the root level of the tree. Additionally, similar dashed lines are used to indicate further hierarchal levels and structural associations within the tree. Node items are used to provide indication of hierarchal levels (e.g., "branches") and also indicate whether a level is currently displayed or hidden within the navigational tree. The node items illustrated in FIG. 10 are comprised of a node icon connected by a short dashed line to a folder icon. An example of such a node item is the node item comprised of node icon 1005 connected by a short dashed line to folder icon 1006. In this case, the node item is in its "closed state". When a node item is in such a closed state, the hierarchal level represented by the node item is not displayed. Node icon 1003 displays a "plus" symbol (e.g., a "+") to indicate that its associated node item may be selected in order to display its associated hierarchal level within the Products and Services navigational tree. In addition, folder icon 1006 is displayed as an image of a closed folder, further suggesting to a user that the folder may be "opened" to reveal its contents (e.g., the items that exist at the node item's hierarchal level). The node item comprised of node icon 1007 and folder icon 1008 provides an example of a node item in its "open state", and thus displaying items associated with its hierarchal level. In this case, node icon 1007 displays a "minus" symbol (e.g., a "–") and folder icon 1008 is displayed as an image of a open folder. Additionally, items at or beneath that node item's hierarchal level are represented by object items 1009A–1009C and a node item comprised of node icon 1010 and folder icon 1011. If a user selects an object item in the Products and Services navigational tree, the GUI will replace e-commerce application object 901 with the e-commerce application object associated with the selected object item.

If the search item comprised of text area 1000 and search button 1001 is employed by a user (operated in the same fashion as previously described search items), the GUI will replace the contents of scrollable panel 1002 with a navigational tree of results. That navigational tree of results will contain those references to e-commerce application objects that match keywords submitted by the user via the search item. As with the Products and Services navigational tree, a user's selection of a object item within the navigational tree of results will cause e-commerce application object 901 to be replaced with an active e-commerce application object that is associated with the selected object item. Back button item 1013 and forward button item 1014 permit a user to navigate his or her sequence of navigational selections within scrollable panel 1002. As a user performs selection of node items within the navigational trees presented within scrollable panel 1002, or initiates keyword searches using the search item comprised of text area 1000 and search button 1001, the contents of scrollable panel 1502 are changed to present the results of those actions. Back button item 1013 and forward button item 1014 permit the user to successively restore the contents of scrollable panel 1002 to the results displayed after each of these changes. Back button item 1013 permits a user to step backward through this sequence of changes and forward button item 1014 permits forward movement through the sequence after back button 1013 has been used. Top button item 1015 restores Things panel 209 to its initial state (e.g., displaying e-commerce application object 901 and "Search Products and Services" item 902 as illustrated in FIG. 9.)

Hierarchal Containment Structure

The present invention's hierarchal containment structure defines the quantity and arrangement of all elements appearing in the invention's GUI. This hierarchy consists of two parts:

(a) The "foundation" portion of the invention's containment hierarchy consists of all elements in the root-level and some elements in second level of the invention's containment hierarchy. Because the present invention is intended to operate across many different computer devices, the root level must contain a limited number of elements. This is because of the limited display resolution of smaller computing devices. The GUI of the preferred embodiment of the invention includes only six elements in its root-level and can be easily recognized by a typical user when rendered on such small display systems.

(b) The "dynamic" portion of the invention's hierarchy is dynamically defined by users and administrative personnel as they assign and remove elements and hierarchal branches during routine interaction with the invention. Such elements and hierarchal structures are maintained within one or more databases provided by a server computer with which the invention interacts. The items and branches of this dynamic portion of the invention's hierarchy extend from, and are contained by, the elements in the foundation portion of the hierarchy.

The elements assigned to the invention's hierarchy are defined by the prioritized requirements of a typical user of the present invention and the range of display systems in which the invention's GUI will be presented:

(a.) The quantity of root-level container objects is limited to be less than, or equal to, the maximum number of such container objects that can be recognizably presented in the display device of lowest pixel-resolution among other computer systems a typical user of said GUI would seek to operate.

(b.) The object items, application objects, and other items typical user of the invention are collected into groups, the quantity of such groups being equal to the quantity of root-level container objects. Each group is assigned to a root-level container object thus establishing a second hierarchal branch of the containment hierarchy extending from its root-level;

(c.) Objects and items of similar type and function are organized into groups and subgroups. The organization of such groups is used to define further hierarchal branches within the invention's containment hierarchy. The objects and items are then distributed to those further hierarchal branches.

Figure 11:
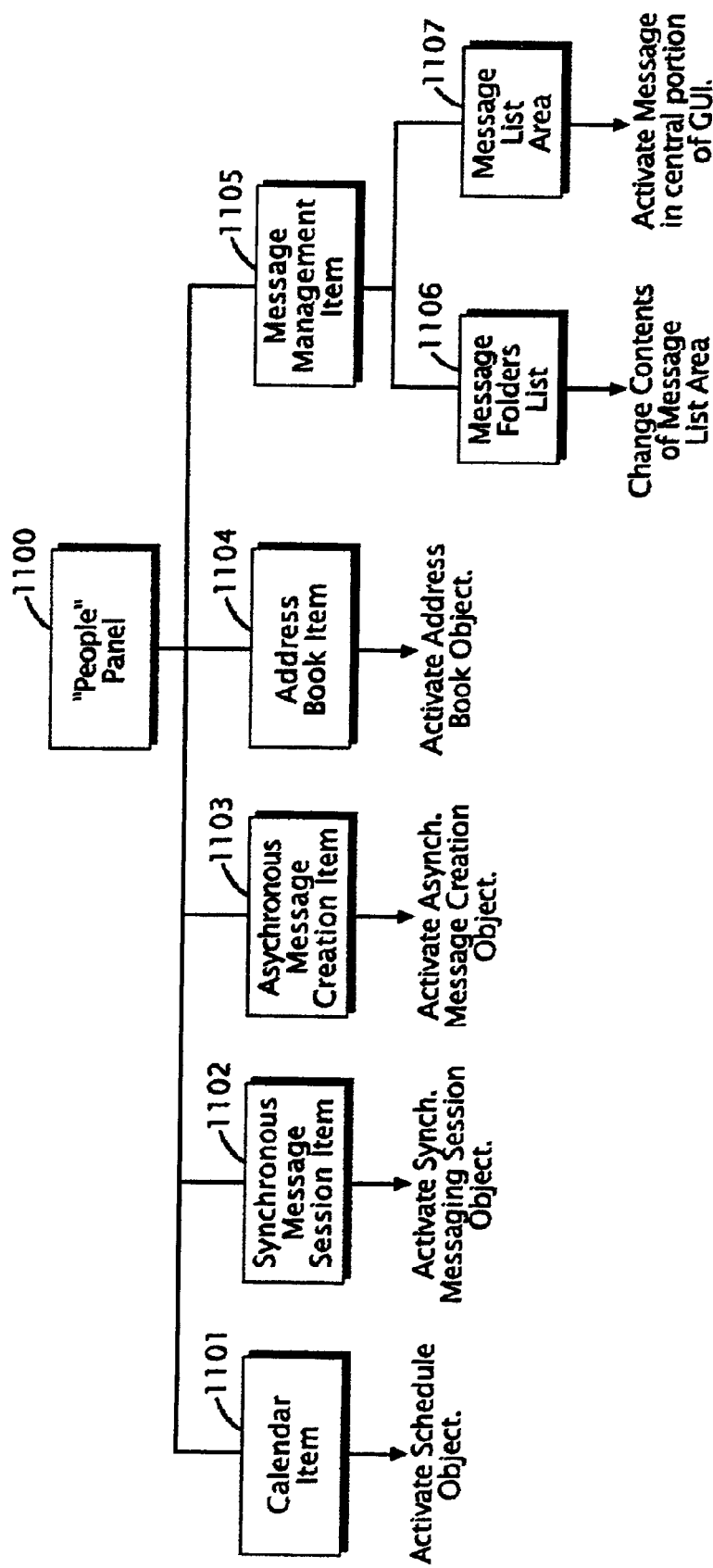
FIG. 11 provides a diagram showing the containment hierarchy of elements included in a root-level container element designated "People" panel according to one embodiment of the invention.

(d.) Those objects and items that a typical user of the invention would most frequently access will be distributed to those branches of the invention's containment hierarchy that are closest to its root-level;

FIG. 11—Preferred Embodiment—People Panel Hierarchy

In the preferred embodiment of the invention, the People panel contains items that create, receive, store, manage, and schedule communication between a user of the invention and other people and organizations. A diagram of the hierarchal relationships of these items is illustrated in FIG. 11.

Items in the People panel 1100 that control asynchronous messaging functions (e.g., email, voice-mail, video-mail or similar messaging systems) are provided in the form of buttons and lists that allow the creation, reception, transmission, and organized storage of these types of messages. To create a message of this type, a user would select the "asynchronous message creation item" 1103 (e.g., a "create message" button or icon), that in turn produces an "item event". The GUI then interprets the event and activates a "Asynchronous message creation object" in the central portion of the GUI to accept further input from the user toward creation of a message. A "message management item" 1105 provides for the organized storage of these asynchronous messages by means of its "message folders list" 1106 and "message list area" 1107. The message folders list 1106 presents a list of "folder" items. A folder is a commonly used GUI element and its appearance and operational behavior are well-known in the art. In the present invention, such folders are visual representations of logical sub-groups within the structure of a database provided by a server computer with which the GUI interacts. Although the image of a file folder, commonly found in a user's office, is often used within the art as a graphical representation of this GUI element, some embodiments of the invention will present a folder as a simple textual item (e.g. the folder's name). This is because some computer devices in which the invention is operated may have displays with limited pixel resolution. In such displays, the combination of a textual and graphical representation would be an inefficient use of available display area. If a folder item within the message folder list 1106 is selected, the GUI will respond to the associated item event by changing the contents of the message list area 1107. The message list area 1107 will be filled with a list of brief, single-line references to messages contained in the selected folder (e.g., each asynchronous message's sender, subject, date or other information). If a message reference within the message list area 1107 is selected, the GUI will respond to the associated item event by retrieving the referenced message from its storage location, and activating it within the central portion of the GUI.

Also within the People panel 1100, is a "synchronous message session item" 1102 that is used to initiate synchronous messaging sessions (e.g., real-time chat, Internet telephony, audio and video conferencing) with other users of a network. When this item is selected, the GUI responds to the associated item event by activating a synchronous messaging session object in the central portion of the GUI to accept further input from the user toward establishing such a session. An "address book item" 1104 is provided so the user may store and manage contact information about people and organizations. When the address book item 1104 is selected, the GUI will respond by activating an address book object in the central portion of the GUI that will permit the user to manage and utilize the contact information. The information accessed within that object is stored in the database of a server computer with which the invention interacts. A "calendar item" 1101 is provided so that the user may manage his or her appointment schedule. In some embodiments of the present invention, the computer in which the GUI is operating will have a display system of limited pixel resolution. In this case, the selection of this item will cause the GUI to respond to the resulting item event by activating a schedule object in the central portion of the GUI. The user may then manage his or her appointment schedule using that object. In some embodiments of the invention, the computer in which the GUI is operating will have a display system of sufficient pixel resolution to permit a more detailed calendar item 1101. In this case, the calendar item 1101 will visually represent a calendar of the month during which the invention is operating (e.g., an image similar to a desk calendar a user might find in his or her office). This version of the calendar item 1101 will generate item events when individual dates within it are selected. These events will activate schedule objects in the central portion of the GUI that display the user's schedule for the selected dates and permit further management. If the invention receives notification that a asynchronous message for the user has been received, or that a synchronous messaging session from another user of the network is requested, the user will be signaled of the event by a visual notification within the GUI. Where possible, the invention will also sound an audio signal to alert the user of those events. In such cases, the GUI will activate a application window in the central portion of the GUI that will provide the user with suitable means of responding to the events.

Figure 12:
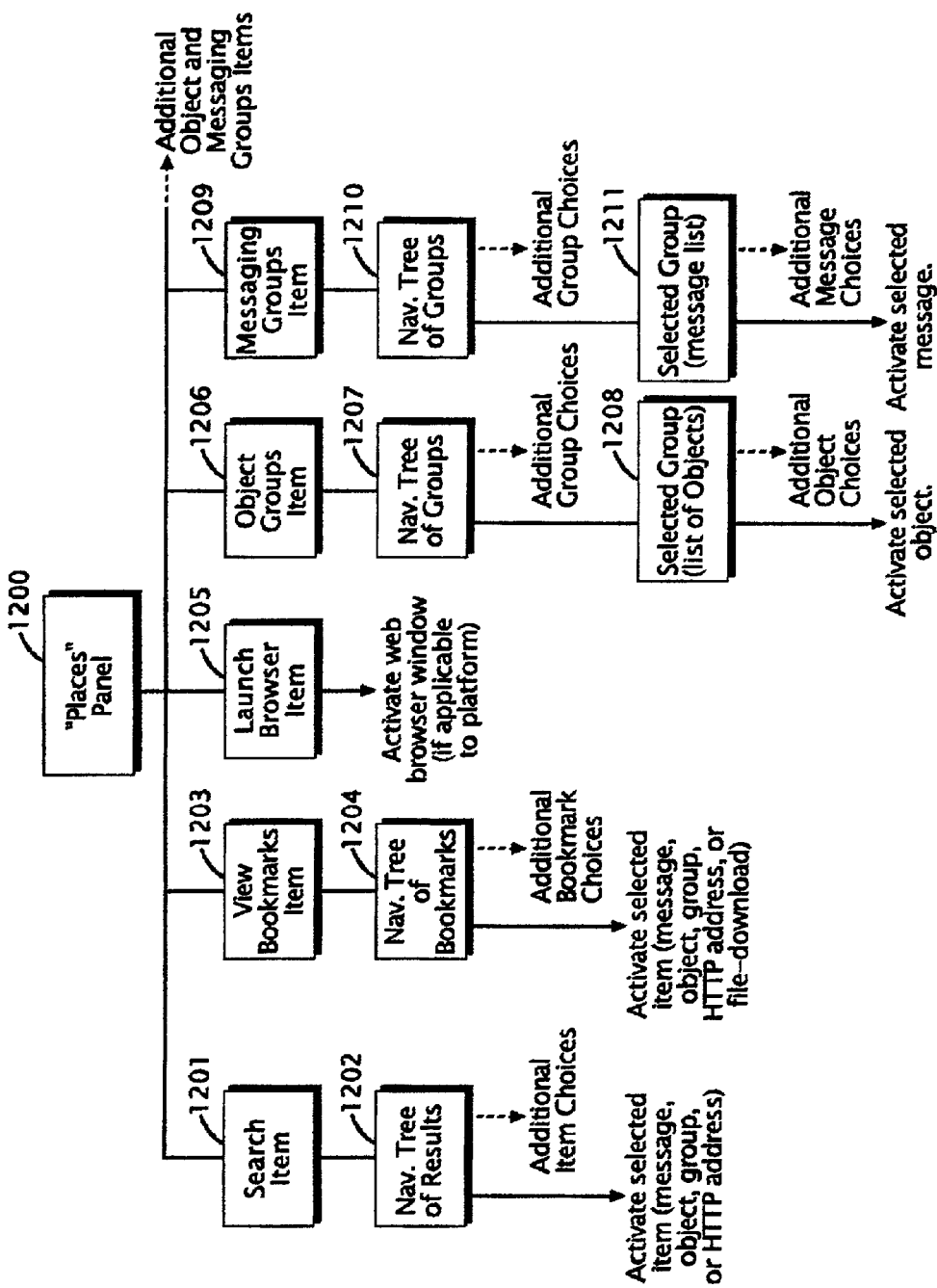
FIG. 12 provides a diagram showing the containment hierarchy of elements included in a root-level container element designated "Places" panel according to one embodiment of the invention.

FIG. 12—Preferred Embodiment—Places Panel Hierarchy

In the preferred embodiment of the invention, the Places panel contains items that represent a network's organization, facilitate searching a network, or reference retrievable items stored in the file systems of other networked computers. A diagram of the hierarchal relationships of these items is illustrated in FIG. 12. Some of these items are used for selecting specific hierarchies of documents and other items stored in a network. When selected by a user, the GUI will cause a navigational tree, representing the item's associated hierarchy, to appear in the panel. A navigational tree is a GUI element well-known in the art and provides, in a simple "outline" format, a visual, interactive representation of a network's topology, or the organization of data within a computer's mass storage system. In the case of the present invention, these trees will also represent the organizational structure of a database within a server computer with which the invention interacts.

The Places panel 1200 provides a means of storing references to a user's favorite items located within one or more networks accessible to the invention. These references, frequently referred to in the art as "bookmarks", are accessed by selection of a "view bookmarks" item 1203. In the case of the present invention, these bookmarks may be references to Internet web sites, messaging groups (e.g. newsgroups), data or program objects, or files a user has previously stored in the server computer with which the invention interacts. When the view bookmarks item 1203 is selected, the GUI responds to the associated item event by presenting a navigational tree of bookmarks 1204 in the Places panel 1200, replacing any navigational tree or group of items displayed in the panel 1200. A user may then select an item within the navigational tree 1204, thereby causing the GUI to respond to the associated item event in a manner appropriate to the selected item. If a reference to a Internet web site is selected, and a web browser application is supported by and installed in the computer in which the GUI is operating, the GUI will launch a new web browser window that is directed toward the referenced web site. If a reference to a messaging or object group is selected, the GUI will present the associated group's message items or object items in the Places panel 1200, replacing any navigational tree or group of items displayed in the panel 1200. If a reference to a single message, program object, or data object is selected, the GUI will activate that item in the central portion of the GUI in a manner appropriate to its type. If a reference to a user's previously stored file is selected, some embodiments of the present invention will initiate a download process to transfer the file from a server computer with which the invention interacts and store the file in the computer in which the GUI is operating. In some embodiments of the invention, the functional design of the computer in which the GUI is operating may restrict or inhibit the downloading of files from a network. In this case, the GUI will inform the user of this condition by presenting an advisory message in the central portion of the GUI.

The Places panel 1200 provides a means of supplying a user with a new web browser window (e.g., a browser window that has not been directed to a web site) through use of a "launch browser" item 1205. This item 1205 will appear in the Places panel 1200 only if a web browser application is supported by and installed in the computer in which the GUI is operating. When this item 1205 is selected, the GUI will respond to the associated item event by initiating the activation of a new web browser window via the installed web browser application.

The Places panel 1200 will contain one or more items called an "object groups" item 1206 to enable a user to browse through a hierarchy of groups of data or application objects. When this item 1206 is selected by a user, the GUI will cause a navigational tree of groups 1207 to appear in the panel 1200, replacing any navigational tree or group of items displayed in the panel 1200. If a group item in the navigational tree of groups 1207 is selected, the GUI will present the selected group 1208 as a list of objects in the Places panel 1200, replacing the navigational tree of groups 1207. If a program object or data object in the list 1208 is selected by the user, the GUI will activate the data object or program object in the central portion of the GUI.

The Places panel 1200 will contain one or more items called a "messaging groups item" 1209 to enable a user to browse through a hierarchy of messaging groups (e.g., newsgroups) When this item 1209 is selected by a user, the GUI will cause a navigational tree of groups 1210 to appear in the panel 1200. If a group item in the navigational tree 1210 is selected, the GUI will present the selected group 1211 as a list of message items in the Places panel 1200, replacing the navigational tree of groups 1210. If a message in the list 1208 is selected by the user, the GUI will activate the message in the central portion of the GUI.

The Places panel 1200 will contain a "search" item 1201 that allows a user to enter text into a text-entry field and submit that text as a query to a database. This type of query technique is well-known in the art and employs at least two GUI elements, a text-entry field and an item to initiate the submission of user-entered text to a software process that performs the search. In the present invention, the database searched by the search item 1201 will contain references to groups, messages, objects, files, web sites and other items. Although all embodiments of the invention will include a text-entry field and a button as part of the search item, some embodiments of the invention will provide additional GUI elements (e.g., fields and checkboxes) to enable the user to further define his or her query. Upon completion of the database query process, the GUI will present the query's results in a "navigational tree of results" 1202 in the Places panel 1200, replacing any navigational tree or group of items displayed in the panel 1200. If a user selects an item in the navigational tree 1202, the GUI will respond to the associated item event in a manner appropriate to the item's type.

Figure 13:
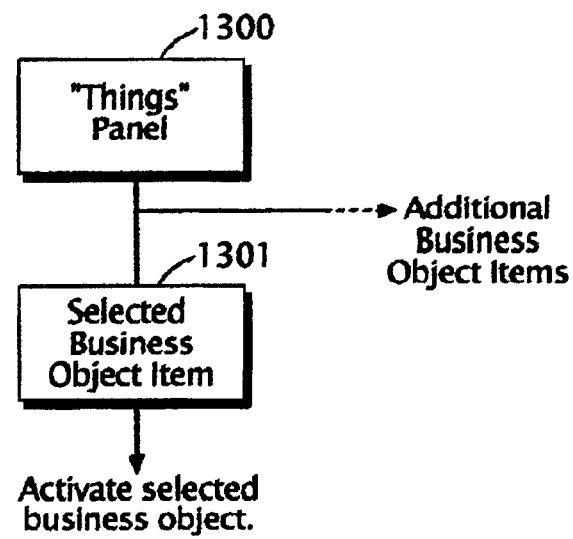
FIG. 13 provides a diagram showing the containment hierarchy of elements included in a root-level container element designated "Things" panel according to one embodiment of the invention. This diagram specifically represents the panel's hierarchy when that embodiment of the invention is privately deployed by an organization for use by authorized users.

FIGS. 12 Through 13—Preferred Embodiment—Things Panel Hierarchy

In the preferred embodiment of the invention, the Things panel may contain either of two different sets of items depending upon the business purpose for which the present invention is deployed. If the invention is deployed by an organization for use by those having a business relationship with the organization (e.g., its employees), this panel will contain items that facilitate business functions within that organization (e.g., business software applications, database queries, or other items). A diagram of the Things panel deployed in this manner, and illustrating the hierarchal relationships of such items, is provided in FIG. 13. If the invention is deployed as a revenue generating service of a commercial enterprise, for use by members of the general public, the panel will contain items that advertise, search for, and facilitate the purchasing of goods and services. A diagram of the Things panel deployed in this manner, and illustrating the hierarchal relationships of such items, is provided in FIG. 14.

If the present invention is deployed by an organization for use by those having a business relationship with the organization as described above, the Things panel 1300 (as illustrated in FIG. 13) will contain one or more business object items" 1301. Although these objects possesses functional characteristics identical to other data or application objects provided in the GUI, their functions are relevant to, and specified by, the organization deploying the invention. If a user selects a business object item, the GUI will activate the item's associated object in a manner appropriate to the object's type.

Figure 14:
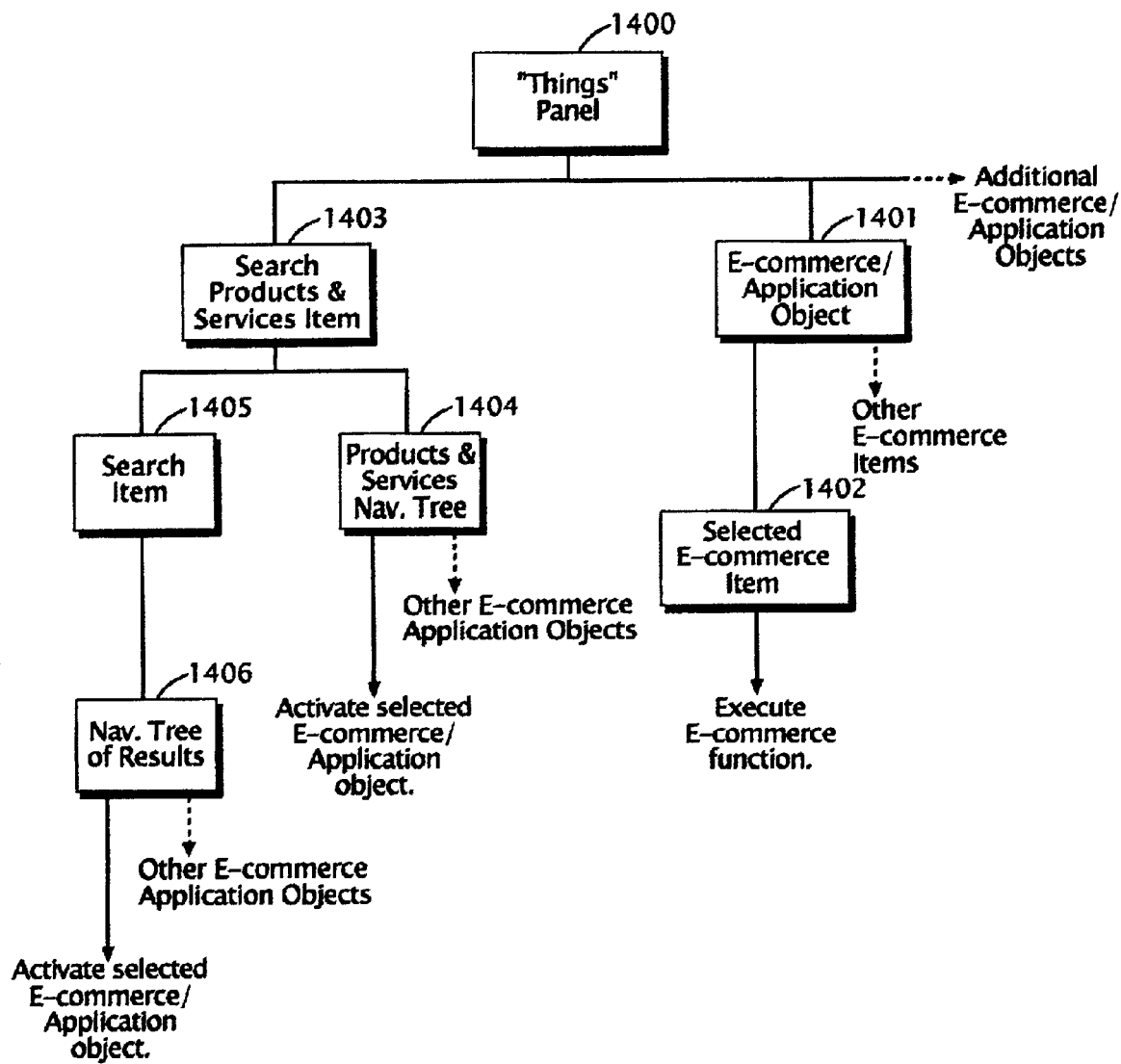
FIG. 14 provides a diagram showing the containment hierarchy of elements included in a root-level container element designated "Things" panel according to one embodiment of the invention. This diagram specifically represents the panel's hierarchy when that embodiment of the invention is commercially deployed for use by members of the general public within a public network.

If the present invention is deployed as a revenue generating service of a commercial enterprise as described above, the content and electronic commerce functions of the Things panel 1400 (as illustrated in FIG. 14) will be assigned by software executing on a server computer that interacts with the invention. That software, based upon its analysis of a user's selection and manipulation of items within the GUI, will select electronic commerce items and content it ascertains as relevant to the user's interests. These electronic commerce items and content are displayed in the Things panel 1400 as part of an "advertising/e-commerce object" 1403. When an "advertising/e-commerce item" 1404 within that object 1403 is selected, the GUI will respond to the associated item event in a manner appropriate to the selected item. A "search item" 1401 is also provided to allow searching a database of products, services, and advertisers. Its operational characteristics are identical to the search item previously described for the Places panel, the only differences being the specific database queried and the location of its navigational tree of results 1402. In the Things panel 1400, the navigational tree of results 1402 produced by the search item 1401 will replace the advertising/e-commerce object 1403. If a user selects an item in the navigational tree 1402, the GUI will respond to the associated item event in a manner appropriate to the item's type.

Figure 15:
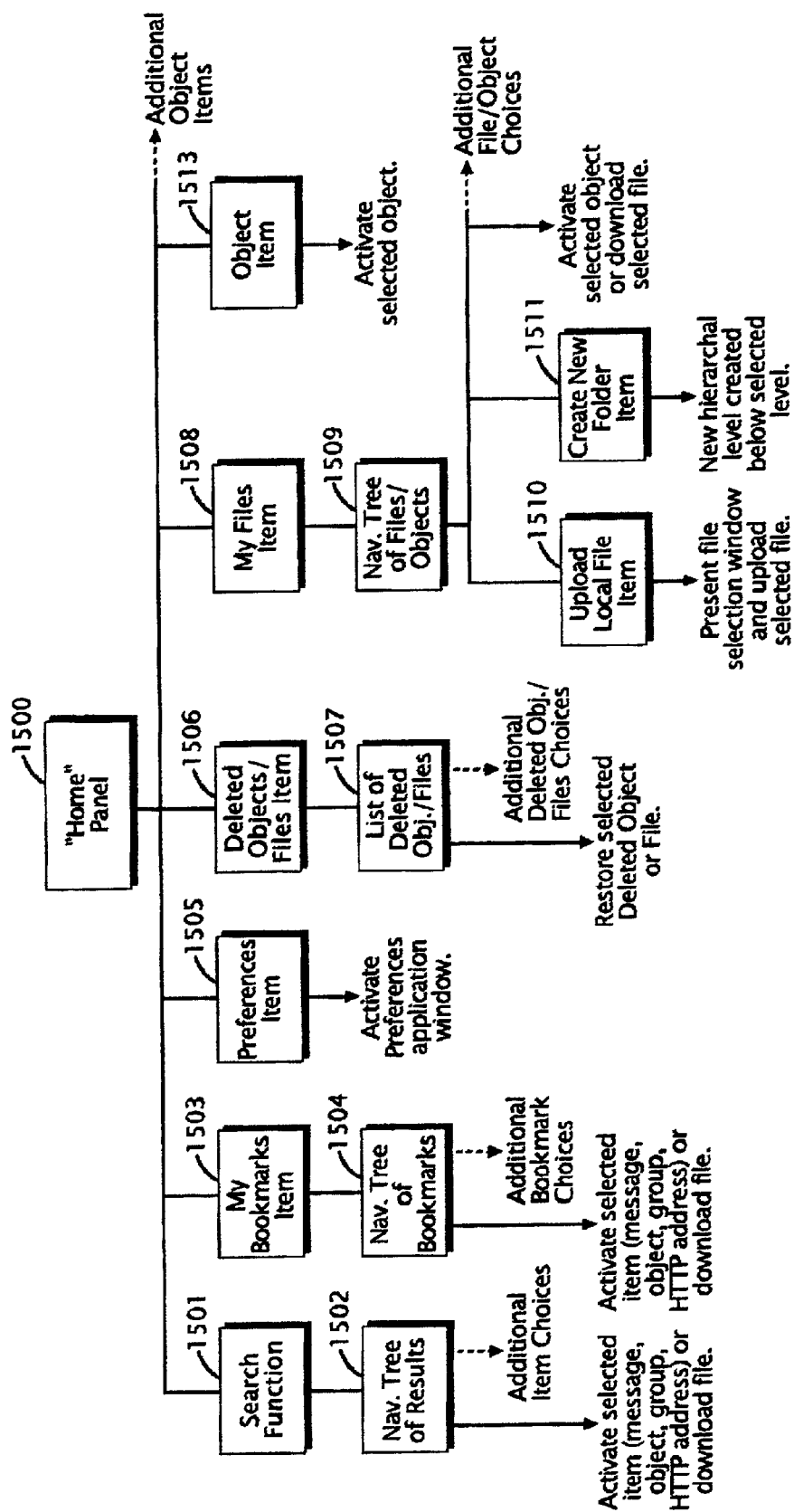
FIG. 15 provides a diagram showing the containment hierarchy of elements included in a root-level container element designated "Home" panel according to one embodiment of the invention.

FIG. 15—Preferred Embodiment—Home Panel Hierarchy

In the preferred embodiment of the invention, the Home panel contains items generally related to a user's organization and storage of their personal items within the mass storage subsystem of a computer. For most embodiments of the present invention, this storage is provided within the mass storage subsystem of a server computer. However, some embodiments may also employ this panel to manage and access the local mass storage subsystem of the computer in which the invention's GUI operates. The home panel also contains an item for configuration of certain operational characteristics of the GUI, an item for recovery of files and other items a user has previously discarded, items for activation of application objects or data objects, an item duplicating the function of the bookmarks item in the Places panel, and a search item to aid in locating a user's personal items within the scope of items accessible in the Home panel. A diagram of the hierarchal relationships of these items is illustrated in FIG. 15.

The Home panel 1500 provides a "preferences item" 1505 that is used to configure operational parameters for the GUI as a whole. When this item is selected, the GUI responds by activating a preferences application window in the central portion of the GUI for configuration of these parameters. The Home panel 1500 will contain one or more "object items" 1513. When such an item is selected, the GUI will activate its associated data object or program object in the central portion of the GUI. A "search item" 1501 to enable a user to search a database of references to the contents the user's personal storage space accessed using the Home panel 1500. Its operational characteristics are identical to the search item previously described for the Places and Things panels, the only differences being the specific database queried and the location of its navigational tree of results. In the Home panel 1500, the "navigational tree of results" 1502, presented by the GUI in response to the user's selection of the search item 1501, will replace any navigational tree or group of items displayed in the panel 1500. If a user selects an item in the navigational tree 1502, the GUI will respond to the associated item event in a manner appropriate to the item's type.

The Home panel 1500 provides a "view bookmarks item" 1503 duplicating the function of the view bookmarks item in the Places panel, the only difference being the location of its resulting navigational tree of bookmarks. When the view bookmarks item 1503 is selected, the GUI will present a "navigational tree of bookmarks" 1504 in the Home panel 1500, replacing any navigational tree or item group displayed in the panel 1500. If a user selects an item in the navigational tree 1504, the GUI will respond to the associated item event in a manner appropriate to the item's type.

The Home panel 600 provides a "my files item" 608 to enable a user to view, manage, store and retrieve objects and files they have previously stored on a server computer with which the present invention interacts. When my files item 1508 is selected, the GUI will present a "navigational tree of files/objects" 1509 in the Home panel 1500, replacing any navigational tree or item group displayed in the panel 1500. If a user selects an object item in the navigational tree of files/objects 1509, the GUI will respond to its associated item event in a manner appropriate to the item's associated object. If a user selects a file they had previously stored in a server computer with which the present invention interacts, some embodiments of the present invention will initiate a download process to transfer the file from a server computer with which the invention interacts and store the file in the computer in which the GUI is operating. In this case, the GUI will respond to the associated item event by providing the user with a file-selection window representing the mass storage subsystem of the computer in which the GUI operates. Upon the user's selection of a storage location, the invention will retrieve the selected file from the server computer and store the file in the selected location. In some embodiments of the invention, the design of the computer device in which the GUI is operating may prohibit the downloading of files. In this case, the GUI will not initiate a download process, but inform the user of this restriction by presenting an advisory message in the central portion of the GUI. In some embodiments of the invention, each hierarchal level of the navigational tree of files/objects 1509 will contain a "upload local file" item 1510. When that item is selected by a user, the GUI will respond to the associated item event by providing the user with a file-selection window representing the mass storage subsystem of the computer in which the GUI operates. Upon the user's selection of a file, the invention will transfer the file and store it in the mass storage subsystem of a server computer with which the invention interacts. Files uploaded in this manner will be represented as items in the navigational tree of files/objects 1509. In some embodiments of the invention, the design of the computer device in which the GUI is operating may prohibit the uploading of files. In this case, the upload local file item 1510 will not appear in the navigational tree of files/objects 1509.

Figure 16:
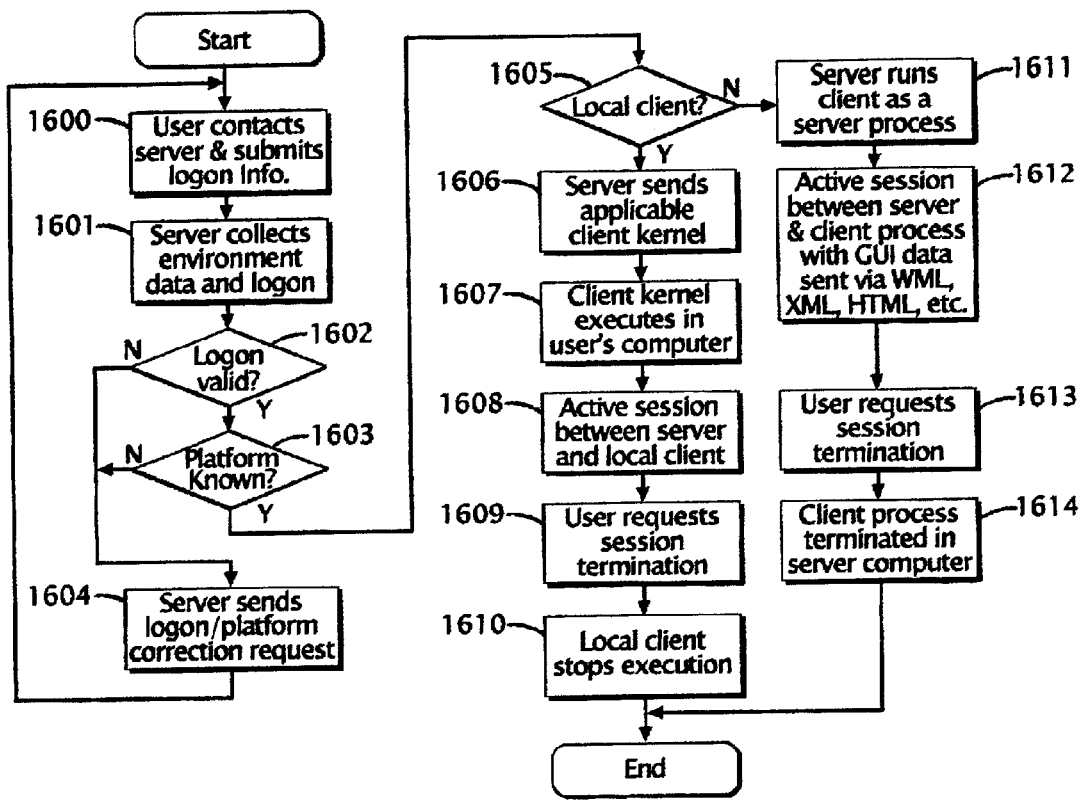
FIG. 16 provides a flow-chart diagram showing the logic governing user and program actions that comprise an operational session between the user and the present invention.

FIG. 16—Session Logic

Figure 17:
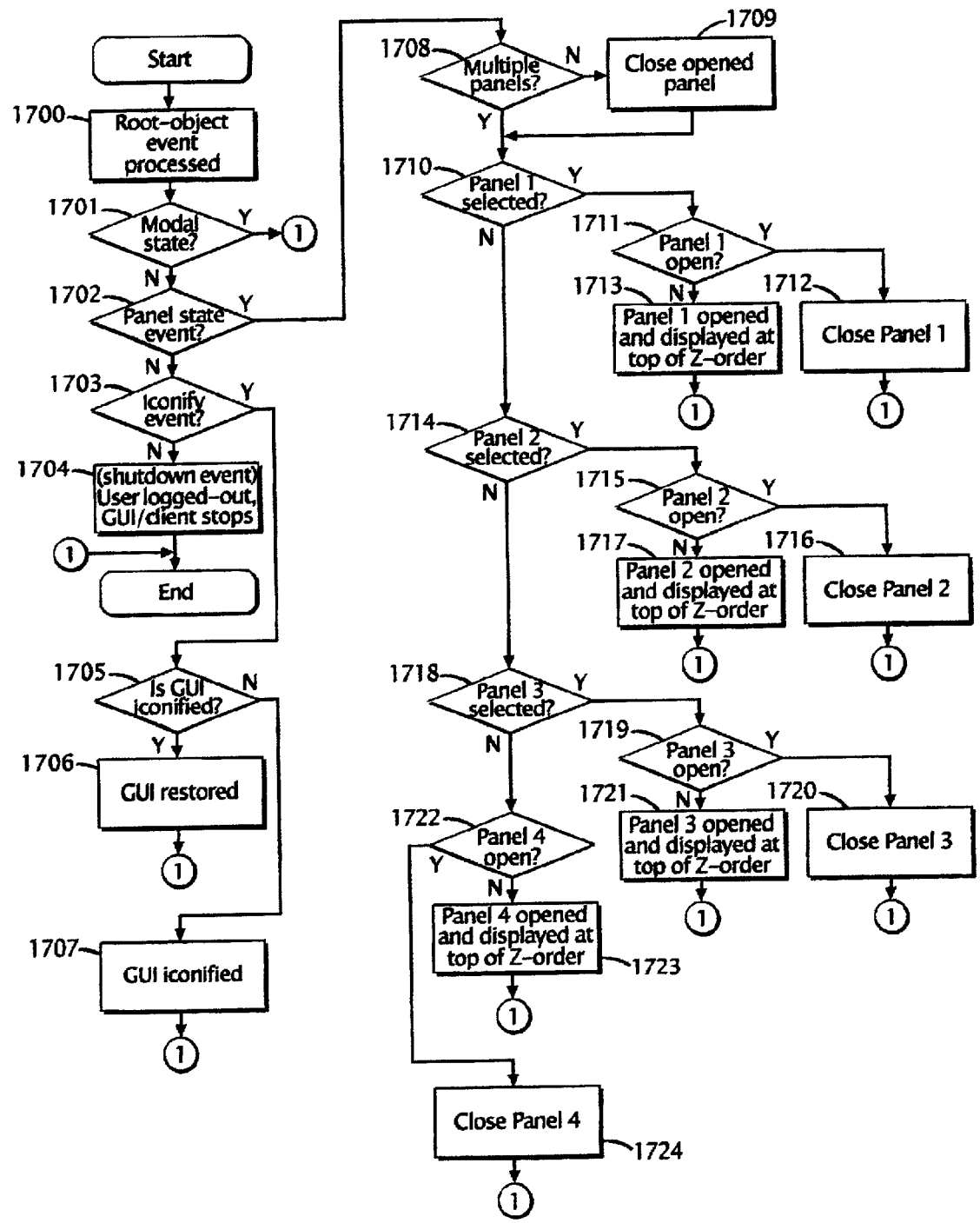
FIG. 17 provides a flow-chart diagram showing the logic for processing events received by elements included in the root-level of the invention's hierarchy. Specifically, this flow-chart diagram shows such logic applied to elements included in the preferred embodiment of the invention.

FIG. 17—Preferred Embodiment—Event Processing for Root-objects

FIG. 17 provides a flowchart that illustrates event processing for objects at the root of the invention's hierarchy. In the preferred embodiment of the invention, the items that can generate such root object events include the People, Places, Things and Home panels, as well as the Iconify and Close buttons. If a root-object event 1700 is received the invention's GUI first determines if the GUI is in a modal state 1701 (e.g., awaiting a user's required response to dialog window or other high priority condition). If the received event is a panel state event 1702 (e.g., an event generated by a user selecting the portion of a panel provided for opening and closing the panel), a further test is performed to determine if the computer device in which the invention's GUI is operating can support simultaneously open panels 1708. This test is provided for computer systems containing displays and input systems of limited capability. If the computer device in which the invention's GUI is operating cannot support such simultaneously open panels, any previously opened panel will be closed 1709. A series of tests is next performed to identify which of the four panels has been selected (1710, 1714, and 1718). If the selected panel is determined by tests 1711, 1715, 1719, and 1722 to be in its open state, the invention's GUI will close the selected panel (1712, 1716, 1720, and 1724). If those same tests determine the selected panel to be currently in its closed state, it will be opened and made topmost of all opened panels (1713, 1717, 1721, and 1723). The order of such overlapping elements in a GUI is often referred to in the art as "z-order".

Figure 18:
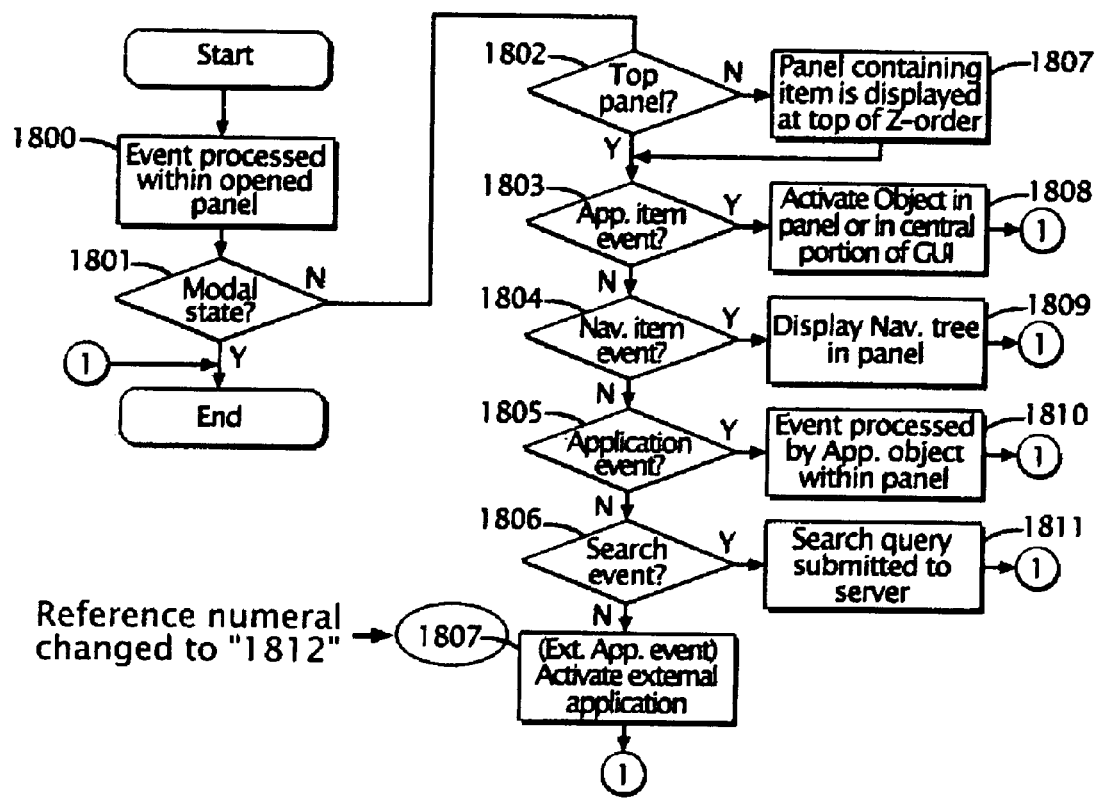
FIG. 18 provides a flow-chart diagram showing the logic for processing events received by elements within the container elements included in the root-level of the invention's hierarchy. Specifically, this flow-chart diagram shows such logic applied to elements included in the preferred embodiment of the invention.

FIG. 18—Preferred Embodiment—Event Processing within Panels

FIG. 18. provides a flowchart that illustrates event processing for objects within the People, Places, Things and Home panels. In the preferred embodiment of the invention, a user's selection of an object within any panel generates an event 1800. The invention's GUI first determines if the GUI is in a modal state 1801 and performs no further processing if it is in such a state. If not in a modal state, the z-order of the panel containing the object is tested to determine if is topmost of any opened panels 1802 and made topmost if it is not 1807. Tests are then performed to determine the type of object within the panel that generated the event (1803, 1804, 1805, and 1806). If the event was generated by an application object item, its associated application object will be retrieved from a server with which the invention's GUI interacts and made active in the central portion of the GUI 1808. If the event was generated by a navigational object item, its associated navigational object (a navigational tree, for example) will be presented within the panel 1809. If the event was generated by an active application object within the panel, the event will be passed to that active application for processing 1810. If the event was generated by an search object item, query elements of provided by the user within the search object will be transmitted to a server with which the invention's GUI interacts 1811. The results of such a search will later be returned within the panel. If the event was generated by an external application object item, its associated application within the computer in which the GUI is executing will be activated by that computer's operating system 1807.

Figure 19:
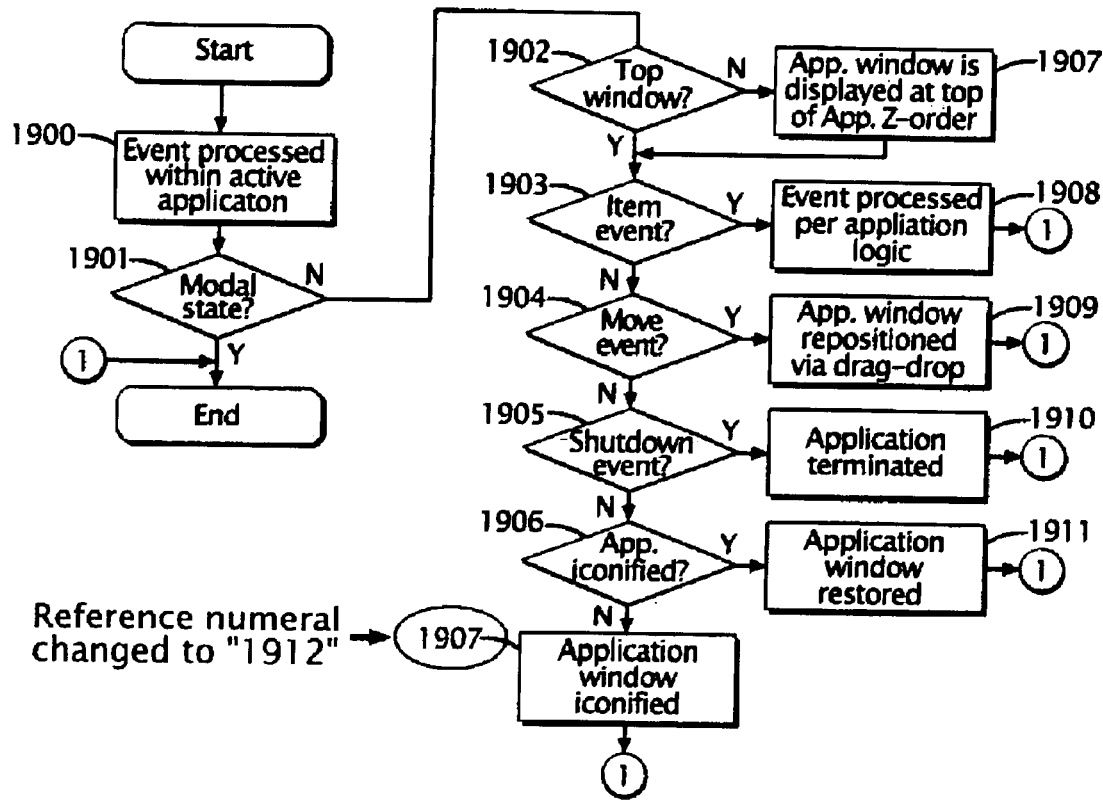
FIG. 19 provides a flow-chart diagram showing the logic for processing events received by elements within an active application object presented in the central portion of the invention's GUI. Specifically, this flow-chart diagram shows such logic applied to elements included in the preferred embodiment of the invention.

FIG. 19—Event Processing within Active Applications

FIG. 19. provides a flowchart that illustrates event processing for active application objects that are executing in the central portion of the invention's GUI. In the preferred embodiment of the invention, a user's selection of an object within any active application object generates an event 1900. The invention's GUI first determines if the GUI is in a modal state 1901 and performs no further processing if it is in such a state. If not in a modal state, the z-order of the application window containing the object is tested to determine if is topmost of any other such windows 1902 and made topmost if it is not 1907. Tests are then performed to determine the source of the event generated (1903, 1904, 1905, and 1906). If the event was generated by an object item, the event will be passed to the application for processing 1908. If the event was generated by a user's attempt to move the application window, the window will be reposition in a drag-drop fashion 1909. If a shutdown event was generated, the active application will be terminated and its window removed from the central portion of the GUI 1910.

If an Iconify event was generated, and the active application is currently represented by an application window, the active application will be represented by an icon within the central portion of the GUI 1907. If the iconify event is received, and the active application is currently represented by an icon, the active application will be represented by an application window within the central portion of the GUI 1907.

Thus, a method and apparatus for accessing information, computer programs and electronic communications across multiple computing devices has been described.

I claim:

1. A method for accessing information, computer programs and electronic communications across multiple computing devices using a portable graphical user interface (GUI) executing in a computer that is connected to a computer network comprising:

a. establishing a communication session between said computer and a server computer having means for supplying said GUI with configuration data, data objects, application objects, and other items necessary for the operation of said GUI;

b. presenting within a display device connected to said computer an initial presentation of said GUI containing a plurality of container objects that represent the root-level of a containment hierarchy that controls the presentation of all items contained within said container objects;

c. limiting the quantity of said container objects to be less than, or equal to, the maximum number of such container objects that can be recognizably presented by the display device of lowest pixel-resolution among other computer systems a typical user of said GUI would seek to operate, such operation including the execution, reproduction, and use of said GUI;

d. grouping, by groups of similar type and function, the object items, application objects, and other items said typical user of said GUI would seek to access within said GUI, the quantity of such groups being equal to the quantity of said container objects, and assigning each group of objects and items to a container object within the group of said container objects, such assignment establishing a second hierarchal branch of said containment hierarchy extending from said containment hierarchy's root-level;

e. further defining the hierarchal distribution of object items, application objects, and other items contained within said container objects so that objects and items of similar type and function are organized into groups and subgroups, the organization of which is used to define further hierarchal branches within said containment hierarchy, the objects and items then being distributed to those further hierarchal branches;

f. further defining the hierarchal distribution of object items, application objects, and other items contained within said container objects so that those objects and items that said typical user of said GUI would most frequently access when operating said GUI will be distributed to branches of said containment hierarchy that are closest to said containment hierarchy's root-level;

g. providing, within said container objects, means of navigating branches of said containment hierarchy thereby enabling a user of said GUI to access object items, application objects, and other items that are contained within said container objects;

h. controlling the presentation of said container objects within said initial representation so that each container object of the group of said container objects are displayed in a closed representation, said closed representation meaning that the contents of any container object displaying said closed representation are not visible to a user of said GUI, however, such container object is represented in a manner that allows its selection by said user operating a input device connected to said computer;

i. controlling the presentation of said container objects so that any container object within the group of said container objects, if displaying said closed representation, will be displayed in a open representation in response to a selection event generated by said user's selection of that container object by operation of said input device connected to said computer, said open representation meaning that the contents of any container object displaying said open representation are made visible to said user within that container object;

j. controlling the presentation of said container objects so that any container object within the group of said container objects, if displaying said open representation, will be displayed in said closed representation in response to a selection event generated by said user's selection of a portion of that container object by using said input device connected to said computer;

k. providing means of executing and presenting, within said GUI, application objects retrieved by said GUI from said server computer;

l. providing means for receiving and transmitting electronic communications using said server computer and presenting and creating such communication within said GUI;

m. providing a means of scaling the visual representation of said GUI and all visual elements contained therein so that said GUI may be rendered with visual consistency in the display systems of a variety of computer systems;

n. providing means of storing configuration data, data objects, application objects, computer files and other items in the storage system of said server computer so that said user of said GUI will be able to manage portions of said hierarchy, store and retrieve computer files from said server, and configure operating parameters of said GUI that will persist when such a user operates said GUI at another time using said computer or using another computer connected by said computer network to said server computer, whereby said GUI may be operated across a wide range of computer devices and provide said user with access to information, computer programs and electronic communications.

2. The method of claim 1 wherein said container objects are represented as sliding panels within said GUI.

3. The method of claim 2 wherein each of said sliding panels includes, protruding from the edge of the panel that is closest to the central portion of said GUI, a thin, convex-shaped portion of said panel, the flatted side of the convex shape facing the interior of the panel, thus providing a typical user with a visual suggestion of a handle and psychological reinforcement for the concept that such a handle may be selected to slide such a panel.

4. The method of claim 3 wherein each of said thin, convex-shaped portions also presents an icon that has been chosen to represent the contents of the sliding panel of which it is part.

5. The method of claim 1 wherein said closed representation of any of said container objects is provided by changing the selected container object's representation so that a thin portion of its edge is exposed along the edge of said GUI, the exposed edge being the edge of the selected container object that was closest to the central portion of said GUI prior to said selection event.

6. An article of manufacture comprising:
a computer usable medium having computer readable program code embodied therein for accessing information, computer programs and electronic communications across multiple computing devices using a graphical user interface comprising:

a. computer readable program code configured to cause a computer to establish a communication session between said computer and a server computer having means for supplying said GUI with configuration data, data objects, application objects, and other items necessary for the operation of said GUI;

b. computer readable program code configured to cause a computer to present within a display device connected to said computer an initial presentation of said GUI containing a plurality of container objects that represent the root-level of a containment hierarchy that controls the presentation of all items contained within said container objects;

c. computer readable program code configured to cause a computer to limit the quantity of said container objects to be less than, or equal to, the maximum number of such container objects that can be recognizably presented by the display device of lowest pixel-resolution among other computer systems a typical user of said GUI would seek to operate, such operation including the execution, reproduction, and use of said GUI;

d. computer readable program code configured to cause a computer to group by similar type and function, the object items, application objects, and other items said typical user of said GUI would seek to access within said GUI, the quantity of such groups being equal to the quantity of said container objects, and to assign each group of objects and items to a container object within the group of said container objects, and by such assignment establish a second hierarchal branch of said containment hierarchy extending from said containment hierarchy's root-level;

e. computer readable program code configured to cause a computer to further define the hierarchal distribution of object items, application objects, and other items contained within said container objects so that objects and items of similar type and function are organized into groups and subgroups, the organization of which is used to define further hierarchal branches within said containment hierarchy, the objects and items then being distributed to those further hierarchal branches;

f. computer readable program code configured to cause a computer to further define the hierarchal distribution of object items, application objects, and other items contained within said container objects so that those objects and items that said typical user of said GUI would most frequently access when operating said GUI will be distributed to branches of said containment hierarchy that are closest to said containment hierarchy's root-level;

g. computer readable program code configured to cause a computer to provide, within said container objects, means of navigating branches of said containment hierarchy thereby enabling a user of said GUI to access object items, application objects, and other items that are contained within said container objects;

h. computer readable program code configured to cause a computer to control the presentation of said container objects within said initial representation so that each container object of the group of said container objects are displayed in a closed representation, said closed representation meaning that the contents of any container object displaying said closed representation are not visible to a user of said GUI, however, such container object is represented in a manner that allows its selection by said user operating a input device connected to said computer;

i. computer readable program code configured to cause a computer to control the presentation of said container objects so that any container object within the group of said container objects, if displaying said closed representation, will be displayed in a open representation in response to a selection event generated by said user's selection of that container object by operation of said input device connected to said computer, said open representation meaning that the contents of any container object displaying said open representation are made visible to said user within that container object;

j. computer readable program code configured to cause a computer to control the presentation of said container objects so that any container object within the group of said container objects, if displaying said open representation, will be displayed in said closed representation in response to a selection event generated by said user's selection of a portion of that container object by using said input device connected to said computer;

k. computer readable program code configured to cause a computer to execute and present, within said GUI, application objects retrieved by said GUI from said server computer;

l. computer readable program code configured to cause a computer to receive and transmit electronic communications using said GUI and said server computer, and to enable presentation and creation of such communications within said GUI;

m. computer readable program code configured to cause a computer to scale the visual representation of said GUI and all visual elements contained therein so that said GUI may be rendered with visual consistency in the display systems of a variety of computer systems;

n. computer readable program code configured to cause a computer to store configuration data, data objects, application objects, computer files and other items in the storage system of said server computer so that said user of said GUI will be able to manage portions of said hierarchy, store and retrieve computer files from said server, and configure operating parameters of said GUI that will persist when such a user operates said GUI at another time using said computer or using another computer connected by said computer network to said server computer.

7. The article of manufacture claim 6 wherein said container objects are represented as sliding panels within said GUI.

8. The article of manufacture claim 7 wherein each of said sliding panels includes, protruding from the edge of the panel that is closest to the central portion of said GUI, a thin, convex-shaped portion of said panel, the flatted side of the convex shape facing the interior of the panel, thus providing a typical user with a visual suggestion of a handle and psychological reinforcement for the concept that such a handle may be selected to slide such a panel.

9. The article of manufacture claim 8 wherein each of said thin, convex-shaped portions also presents an icon that has been chosen to represent the contents of the sliding panel of which it is part.

10. The article of manufacture claim 6 wherein said closed representation of any of said container objects is provided by changing the selected container object's representation so that a thin portion of its edge is exposed along the edge of said GUI, the exposed edge being the edge of the selected container object that was closest to the central portion of said GUI prior to said selection event.

* * * * *